(12) United States Patent
Zheng et al.

(10) Patent No.: US 12,516,054 B2
(45) Date of Patent: Jan. 6, 2026

(54) PYRAZOLO[1,5-A]PYRIDINE DERIVATIVES, PREPARATION METHOD THEREFOR AND USE THEREOF

(71) Applicant: SHANGHAI DAIDAI INVESTMENT CONSULTING CO., LTD, Shanghai (CN)

(72) Inventors: Suxin Zheng, Shanghai (CN); Zhongli Wang, Shanghai (CN); Jianping Zhang, Shanghai (CN); Jun Liu, Shanghai (CN); Quanlin An, Shanghai (CN); Wenwen Zhao, Shanghai (CN)

(73) Assignee: SHANGHAI DAIDAI INVESTMENT CONSULTING CO., LTD, Shanghai (CN)

( * ) Notice: Subject to any disclaimer, the term of this patent is extended or adjusted under 35 U.S.C. 154(b) by 1034 days.

(21) Appl. No.: 17/435,703

(22) PCT Filed: Mar. 2, 2020

(86) PCT No.: PCT/CN2020/077449
§ 371 (c)(1),
(2) Date: Oct. 20, 2021

(87) PCT Pub. No.: WO2020/177668
PCT Pub. Date: Sep. 10, 2020

(65) Prior Publication Data
US 2022/0135560 A1    May 5, 2022

(30) Foreign Application Priority Data
Mar. 2, 2019    (CN) .......................... 201910157739.6

(51) Int. Cl.
C07D 471/04    (2006.01)
A61P 35/00    (2006.01)
C07D 519/00    (2006.01)

(52) U.S. Cl.
CPC ............ C07D 471/04 (2013.01); A61P 35/00 (2018.01); C07D 519/00 (2013.01)

(58) Field of Classification Search
CPC ...... C07D 471/04; C07D 519/00; A61P 35/00
See application file for complete search history.

(56) References Cited

U.S. PATENT DOCUMENTS

| | | | |
|---|---|---|---|
| 6,194,406 B1 | 2/2001 | Kane et al. | |
| 10,023,570 B2 * | 7/2018 | Andrews | A61P 35/04 |
| 10,555,944 B2 | 2/2020 | Andrews et al. | |
| 2008/0153883 A1 | 6/2008 | Carroll et al. | |
| 2018/0133213 A1 | 5/2018 | Andrews et al. | |

FOREIGN PATENT DOCUMENTS

| | | |
|---|---|---|
| CN | 108349969 A | 7/2018 |
| CN | 111592538 A | 8/2020 |
| JP | 2017137276 A | 8/2017 |
| WO | 03092686 A1 | 11/2003 |
| WO | 2012092442 A1 | 7/2012 |
| WO | 2014066659 A1 | 5/2014 |
| WO | 2016033445 A1 | 3/2016 |
| WO | WO-2017011776 A1 * | 1/2017 ........... A61K 31/437 |
| WO | 2018071447 A1 | 4/2018 |
| WO | 2018130838 A1 | 7/2018 |
| WO | 2018136661 A1 | 7/2018 |
| WO | 2020114388 A1 | 6/2020 |

(Continued)

OTHER PUBLICATIONS

Kumar, E., Chen, Q., Kizhake, S., Kolar, C., Kang, M., Chang, C., Borgstahl, G., and Natarajan, A. The paradox of conformational constraint in the design of Cbl(TKB)-binding peptides. (2013), Scientific Reports, 3(1639), 1-7 (Year: 2013).*

(Continued)

*Primary Examiner* — Renee Claytor
*Assistant Examiner* — Christopher Lindsay Johnson
(74) *Attorney, Agent, or Firm* — Bayramoglu Law Offices LLC

(57) ABSTRACT

A pyrazolo[1,5-a]pyridine derivative, and a preparation method and medical use thereof are provided. The pyrazolo [1,5-a]pyridine derivative shown in general formula (I), a preparation method of the derivative, a pharmaceutically acceptable salt of the derivative, and use of the derivative or salt as a therapeutic agent, especially as a rearranged during transfection (RET) inhibitor, are provided.

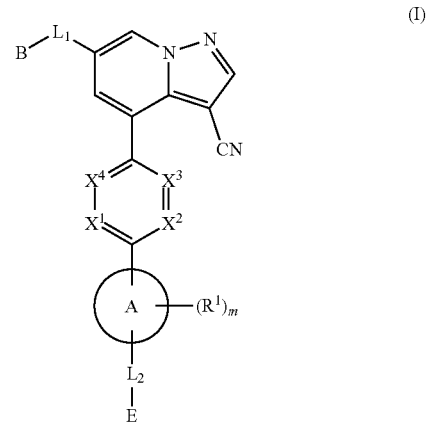

13 Claims, No Drawings

(56) References Cited

FOREIGN PATENT DOCUMENTS

WO     2021088911 A1     5/2021
WO     2021115457 A1     6/2021

OTHER PUBLICATIONS

Elena Arighi, et al., RET tyrosine kinase signaling in development and cancer, Cytokine & Growth Factor Reviews, 2005, pp. 441-467, vol. 16.
Lois M. Mulligan, RET revisited: expanding the oncogenic portfolio, Nature Reviews Cancer, 2014, pp. 173-186, vol. 14.
Ernest L. Eliel, et al., Stereochemistry of Organic Compounds, John Wiley&Sons, Inc., 1994.
Dictionary of Chemical Terms, McGraw-Hill, New York.

\* cited by examiner

PYRAZOLO[1,5-A]PYRIDINE DERIVATIVES, PREPARATION METHOD THEREFOR AND USE THEREOF

CROSS REFERENCE TO THE RELATED APPLICATIONS

This application is the national stage entry of International Application No. PCT/CN2020/077449, filed on Mar. 2, 2020, which is based upon and claims priority to Chinese Patent Application No. 201910157739.6, filed on Mar. 2, 2019, the entire contents of which are incorporated herein by reference.

TECHNICAL FIELD

The present disclosure belongs to the field of medicine, and relates to a pyrazolo[1,5-a]pyridine derivative and a preparation method thereof, a pharmaceutical composition including the derivative, and use of the derivative or the pharmaceutical composition as a therapeutic agent, especially as a rearranged during transfection (RET) protein kinase inhibitor.

BACKGROUND

RET protein belongs to the family of receptor tyrosine kinases, and is a receptor of nerve growth factor (NGF), which plays a role in the normal growth and development of a nervous system, and cell proliferation and survival. A glial cell line-derived neurotrophic factor (GDNF) family ligand (GFL) regulates a downstream signal by binding to RET protein, and the GFL includes neuroturin (NTRN), artemin (ARTN), and persephin (PSPN) (Arighi et al., Cytokine Growth Factor rev., 2005, 16, 441-67). Unlike other receptor tyrosine kinases (RTKs), RET needs to be activated by a ligand. The GDNF family receptor α (GFRα) protein and RET protein can form a multimeric complex. The GFRα receptor is linked to a co-receptor on a cell surface through a glycosylphosphatidylinositol (GPI) bond. It has been found that the GFRα family includes 4 subtypes (GFRα 1 to 4) that can bind to different GFLs. GFL and a GFRα family member form a binary complex, and then the complex binds to RET and recruits it to a cholesterol-rich secondary domain (called lipid raft) on a cell membrane, and the dimerization of RET is induced to form a heterohexamer complex GFL(2)-GFRa(2)-RET(2), thereby activating the activity of RET kinase and the downstream signal.

After a ligand-co-receptor complex is formed, RET undergoes dimerization to induce autophosphorylation of intracellular tyrosine residues of the protein, and then other connexins and signal transduction proteins are further recruited to activate various downstream signal transduction pathways, including Ras-MAPK pathway and PI3K-Akt/mTOR signaling pathway.

Abnormal RET is closely related to the occurrence and development of neoplastic diseases, and is mainly characterized by gain-of-function genetic mutations or RET fusion proteins due to gene rearrangement, both of which will cause the continuous abnormal activation of RET signals. For example, in patients with familial medullary thyroid cancer (FMTC), a proportion of RET point mutations is as high as 95%; in patients with papillary thyroid cancer (PTC), an incidence of RET gene rearrangement is about 20% to 40%; and in addition, in patients with breast cancer, colon cancer, pancreatic cancer, or acute leukemia, the overexpression of RET may occurs (Lois M. Mulligan; RET revisited expanding the oncogenic portfolio, Nature Reviews Cancer 14, 173-186 (2014)). The above-mentioned tumors with RET fusion proteins and RET point mutations all depend on the activation of RET kinase to maintain the proliferation and survival of tumor cells (this dependency is often referred to as oncogene addiction), making these tumors highly sensitive to small-molecule kinase inhibitors targeting RET. At present, some small-molecule kinase inhibitors that target various kinases show an inhibitory activity on RET. For example, vandetanib and cabozantinib have been approved by the FDA for the treatment of thyroid cancer, and other inhibitors, such as ponatinib, nintedanib, and lenvatinib, are also used in the clinical research on tumors with regard to abnormal RET signal activation. However, due to the lack of selectivity for RET proteins, the above-mentioned various kinase inhibitors face different pharmacodynamics and pharmacovigilance problems, which limits the further research and application of the kinase inhibitors in tumors with abnormal RET. Therefore, there is an urgent clinical need for small-molecule kinase inhibitor compounds that target RET with high selectivity.

A series of selective RET inhibitor patents have been published, including PCT applications No. WO2017011776, No. WO2018071447, No. WO2018136661, and the like. The main drug in phase II clinical study is LOXO-292. However, the efficacy, safety, or selectivity of the compounds and test drugs disclosed in the prior art are still problematic. With further deep understanding of the role of RET in tumors, it is still necessary to study and develop a new small-molecule selective RET inhibitor to meet the clinical needs in the treatment of abnormal RET-related diseases.

SUMMARY

The inventors unexpectedly discover through experimental research that a compound of the following formula (I) can effectively inhibit RET,

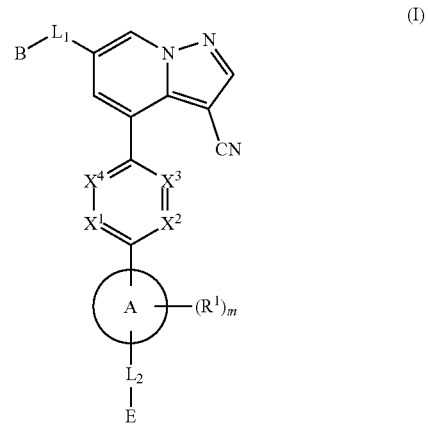

where
the ring A is selected from the group consisting of

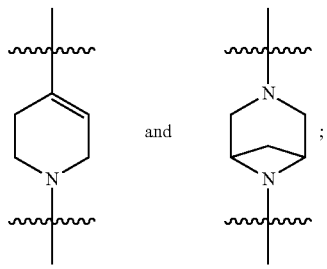 [SMILES: *C1=CCN(*)CC1 ; *N1CC2CC(C1)N2*]

$X^1$ and $X^2$ are each independently selected from the group consisting of CH, CCH$_3$, CF, CCl, and N;
$X^3$ and $X^4$ are each independently selected from the group consisting of CH, CF, and N;
0, 1, or 2 of $X^1$, $X^2$, $X^3$, and $X^4$ is/are N;
$L_1$ is selected from the group consisting of a bond, —($R^aR^bC$)—, —($R^aR^bN$)—, and —O—;
$L_2$ is selected from the group consisting of a bond, -(alkylene)-, —C(O)—, —S(O)—, —SO$_2$—, -(alkylene)-O—, -(alkylene)-S—, -(alkylene)-NR$^1$—, —C(O)-(alkylene)-, and —SO$_2$-(alkylene)-, where a right bond in $L_2$ is linked to E, and the alkylene is optionally further substituted by one or more substituents selected from the group consisting of hydroxyl, halogen, alkyl, alkoxy, cycloalkyl, heterocyclyl, aryl, heteroaryl, —NR$^2$R$^3$, —C(O)NR$^2$R$^3$, —C(O)R$^4$, —OC(O)R$^4$, —NR$^2$C(O)R$^3$, and —SO$_2$NR$^2$R$^3$;
$R^a$ is selected from the group consisting of hydrogen, alkyl, and halogen;
$R^b$ is selected from the group consisting of hydrogen, alkyl, and halogen;
or, $R^a$ and $R^b$, together with C or N atoms attached thereto, form 3-6 membered cycloalkyl or heterocyclyl, where the heterocyclyl includes one or more N, O, and S(O), atoms, and the cycloalkyl or the heterocyclyl is optionally further substituted by one or more substituents selected from the group consisting of hydroxyl, halogen, alkyl, alkoxy, cycloalkyl, heterocyclyl, aryl, heteroaryl, —NR$^2$R$^3$, —C(O)NR$^2$R$^3$, —C(O)R$^4$, —OC(O)R$^4$, —NR$^2$C(O)R$^3$, and —SO$_2$NR$^2$R$^3$;
B is selected from the group consisting of hydrogen, alkyl, alkenyl, alkynyl, cycloalkyl, heterocyclyl, aryl, and heteroaryl, where the alkyl, alkenyl, alkynyl, cycloalkyl, heterocyclyl, aryl, or heteroaryl is optionally further substituted by one or more substituents selected from $R^c$;
E is selected from the group consisting of hydrogen, alkoxy, cycloalkyl, heterocyclyl, aryl, and heteroaryl, where the cycloalkyl, heterocyclyl, aryl, or heteroaryl is optionally further substituted by one or more substituents selected from the group consisting of hydroxyl, halogen, nitro, cyano, alkyl, alkoxy, cycloalkyl, heterocyclyl, aryl, heteroaryl, —NR$^2$R$^3$, —C(O)NR$^2$R$^3$, —C(O)R$^4$, —OC(O)R$^4$, —NR$^2$C(O)R$^3$, and —SO$_2$NR$^2$R$^3$; and the cycloalkyl, heterocyclyl, aryl, or heteroaryl is preferably phenyl or pyridyl;
$R^c$ is selected from the group consisting of hydroxyl, halogen, nitro, cyano, alkyl, alkoxy, cycloalkyl, heterocyclyl, aryl, heteroaryl, —NR$^2$R$^3$, —C(O)NR$^2$R$^3$, —C(O)R$^4$, —OC(O)R$^4$, —NR$^2$C(O)R$^3$, and —S(O)$_2$NR$^2$R$^3$, where the alkyl, alkoxy, cycloalkyl, heterocyclyl, aryl, or heteroaryl is optionally further substituted by one or more substituents selected from the group consisting of hydroxyl, halogen, nitro, cyano, alkyl, alkoxy, cycloalkyl, heterocyclyl, aryl, heteroaryl, —NR$^5$R$^6$, —C(O)NR$^5$R$^6$, —C(O)R$^7$, —OC(O)R$^7$, —NR$^5$C(O)R$^6$, and —SO$_2$NR$^5$R$^6$;
$R^1$ groups are the same or different and are each independently selected from the group consisting of hydrogen, hydroxyl, alkyl, halogen, and alkoxy, where the alkyl or alkoxy is optionally further substituted by one or more substituents selected from the group consisting of hydroxyl, halogen, and alkoxy;
$R^2$, $R^3$, and $R^4$ are each independently selected from the group consisting of hydrogen, hydroxyl, halogen, nitro, cyano, alkyl, alkoxy, cycloalkyl, heterocyclyl, aryl, and heteroaryl, where the alkyl, alkoxy, cycloalkyl, heterocyclyl, aryl, or heteroaryl is optionally further substituted by one or more substituents selected from the group consisting of hydroxyl, halogen, nitro, cyano, alkyl, alkoxy, cycloalkyl, heterocyclyl, aryl, heteroaryl, —NR$^5$R$^6$, —C(O)NR$^5$R$^6$, —C(O)R$^7$, —OC(O)R$^7$, —NR$^5$C(O)R$^6$, and —SO$_2$NR$^5$R$^6$;
or, $R^2$ and $R^3$, together with N atoms attached thereto, form 4-8 membered heterocyclyl, where the 4-8 membered heterocyclyl includes one or more N, O, S(O), atoms, and the 4-8 membered heterocyclyl is optionally further substituted by one or more substituents selected from the group consisting of hydroxyl, halogen, nitro, cyano, alkyl, alkoxy, cycloalkyl, heterocyclyl, aryl, heteroaryl, =O, —NR$^5$R$^6$, —C(O)NR$^5$R$^6$, —C(O)R$^7$, —OC(O)R$^7$, —NR$^5$C(O)R$^6$, and —SO$_2$NR$^5$R$^6$;
$R^5$, $R^6$ and $R^7$ are each independently selected from the group consisting of hydrogen, alkyl, cycloalkyl, heterocyclyl, aryl, and heteroaryl, where the alkyl, cycloalkyl, heterocyclyl, aryl, or heteroaryl is optionally further substituted by one or more substituents selected from the group consisting of hydroxyl, halogen, nitro, cyano, alkyl, alkoxy, cycloalkyl, heterocyclyl, aryl, heteroaryl, carboxyl, and carboxylate;
m is selected from the group consisting of 0, 1, 2, 3, 4, and 5;
n is selected from the group consisting of 0, 1, and 2;
with the proviso that when the ring A is selected from

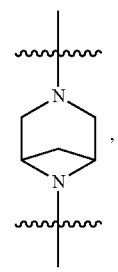

(1) $L_1$ is selected from the group consisting of —($R^aR^bC$)—, —($R^aR^bN$)—, and —S—; and
(2) when $L_1$ is selected from a bond, B is selected from the group consisting of alkenyl and alkynyl, where the alkenyl or alkynyl is optionally further substituted by one or more substituents selected from $R^c$.

In a preferred embodiment of the present disclosure, the compound of general formula (I), or the stereoisomer, tautomer, or pharmaceutically acceptable salt thereof may be a compound of general formula (II), or a stereoisomer, a tautomer, or a pharmaceutically acceptable salt thereof:

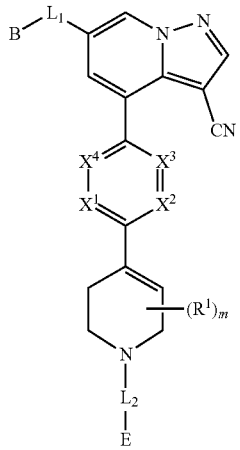

(II)

where
L₁ is selected from the group consisting of a bond, —(RᵃRᵇC)—, —(RᵃRᵇN)—, and —O—, and preferably —O—;
L₂, B, E, X¹, X², X³, X⁴, R¹, Rᵃ, Rᵇ, and m are as defined for general formula (I).

In a preferred embodiment of the present disclosure, the compound of general formula (I), or the stereoisomer, tautomer, or pharmaceutically acceptable salt thereof may be a compound of general formula (III), or a stereoisomer, a tautomer, or a pharmaceutically acceptable salt thereof:

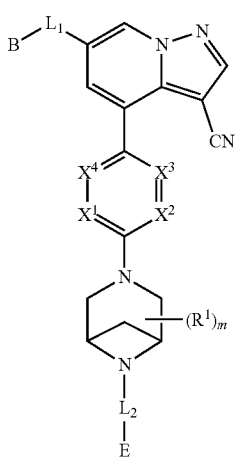

(III)

where
(1) L₁ is selected from the group consisting of —(RᵃRᵇC)—, —(RᵃN)—, and —S—;
preferably, Rᵃ and Rᵇ are each selected from the group consisting of hydrogen and methyl;
(2) when L₁ is selected from a bond, B is selected from the group consisting of alkenyl and alkynyl, where the alkenyl or alkynyl is optionally further substituted by one or more substituents selected from Rᶜ;
L₂, B, E, X¹, X², X³, X⁴, R¹, Rᵃ, Rᵇ, Rᶜ, and m are as defined for general formula (I).

In a preferred embodiment of the present disclosure, a compound of general formula (I), (II), or (III), or a stereoisomer, a tautomer, or a pharmaceutically acceptable salt thereof is provided, where
X¹, X², X³, and X⁴ are each selected from the group consisting of CH and N;
0, 1, or 2 of X¹, X², X³, and X⁴ is/are N; and
preferably, X¹ is N, and X², X³, and X⁴ are CH.

In a preferred embodiment of the present disclosure, a compound of general formula (I), (II), or (III), or a stereoisomer, a tautomer, or a pharmaceutically acceptable salt thereof is provided, where
L₂ is selected from the group consisting of a bond, -(alkylene)-, —C(O)—, —SO₂—, -(alkylene)-O—, -(alkylene)-S—, -(alkylene)-NR¹—, and —C(O)-(alkylene)-, and a right bond in L₂ is linked to E; and
preferably, L₂ is selected from the group consisting of -(alkylene)-, —C(O)—, -(alkylene)-S—, and —C(O)-(alkylene)-;
where the -(alkylene)- is preferably -(methylene)- or —CH(CH₃)—.

In a preferred embodiment of the present disclosure, a compound of general formula (I), (II), or (III), or a stereoisomer, a tautomer, or a pharmaceutically acceptable salt thereof is provided, where B is selected from the group consisting of
(i) 5-6 membered heteroaryl, where the heteroaryl is optionally further substituted by one or more substituents selected from the group consisting of alkyl and halogen; and
preferably pyrazolyl, wherein the pyrazolyl is optionally further substituted by methyl;
(ii) alkyl, where the alkyl is optionally further substituted by one or more hydroxyl; and preferably

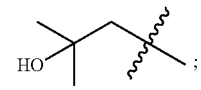
;

(iii) alkenyl or alkynyl, where the alkenyl or alkynyl is optionally further substituted by one or more hydroxyl; and
preferably, when L₁ is a bond,

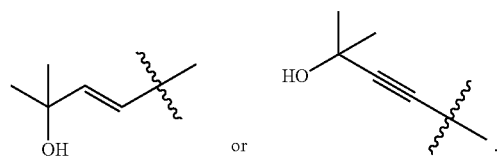
.

Typical compounds of the present disclosure include, but are not limited to:
| Compound No. | Structure | Name |
|---|---|---|
| 1 | 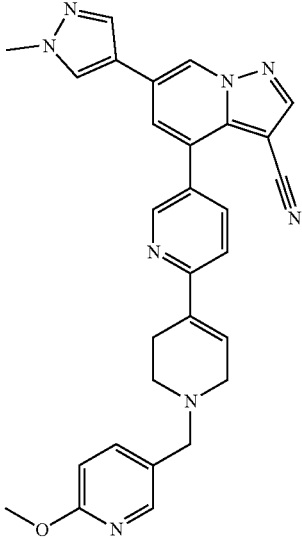 [SMILES: COc1ccc(CN2CC=C(c3ccc(-c4cc(-c5cnn(C)c5)cn5ncc(C#N)c45)cn3)CC2)cn1] | 4-(1'-((6-methoxypyridin-3-yl)methyl)-1',2',3',6'-tetrahydro-[2,4'-bipyridin]-5-yl)-6-(1-methyl-1H-pyrazol-4-yl)pyrazolo[1,5-a]pyridine-3-carbonitrile |
| 2 | 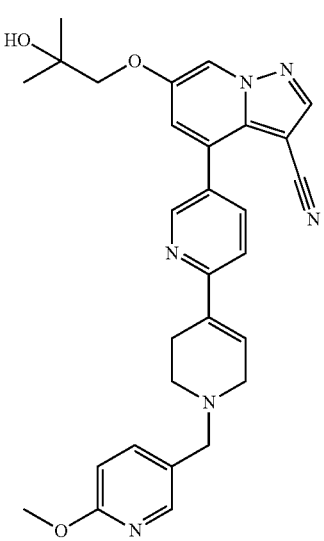 [SMILES: COc1ccc(CN2CC=C(c3ccc(-c4cc(OCC(C)(C)O)cn5ncc(C#N)c45)cn3)CC2)cn1] | 6-(2-hydroxy-2-methylpropoxy)-4-(1'-((6-methoxypyridin-3-yl)methyl)-1',2',3',6'-tetrahydro-[2,4'-bipyridin]-5-yl)pyrazolo[1,5-a]pyridine-3-carbonitrile |

-continued

| Compound No. | Structure | Name |
|---|---|---|
| 3 | | 6-(2-hydroxy-2-methylpropoxy)-4-(1'-((5-methoxypyridin-2-yl)methyl)-1',2',3',6'-tetrahydro-[2,4'-bipyridin]-5-yl)pyrazolo[1,5-a]pyridine-3-carbonitrile |
| 4 | | 6-(2-hydroxy-2-methylpropoxy)-4-(1'-(4-methoxybenzyl)-1',2',3',6'-tetrahydro-[2,4'-bipyridin]-5-yl)pyrazolo[1,5-a]pyridine-3-carbonitrile |
| 5 | | 4-(1'-((5-fluoropyridin-3-yl)methyl)-1',2',3',6'-tetrahydro-[2,4'-bipyridin]-5-yl)-6-(2-hydroxy-2-methylpropoxy)pyrazolo[1,5-a]pyridine-3-carbonitrile |

-continued
| Compound No. | Structure | Name |
|---|---|---|
| 6 | 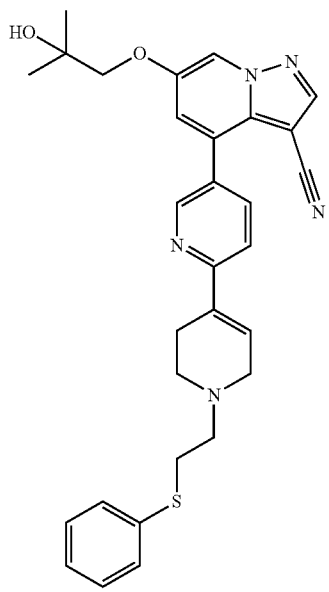 [SMILES: CC(C)(O)COc1cc(-c2ccc(C3=CCN(CCSc4ccccc4)CC3)nc2)c2c(C#N)cnn2c1] | 6-(2-hydroxy-2-methylpropoxy)-4-(1'-(2-(phenylthio)ethyl)-1',2',3',6'-tetrahydro-[2,4'-bipyridin]-5-yl)pyrazolo[1,5-a]pyridine-3-carbonitrile |
| 7 | 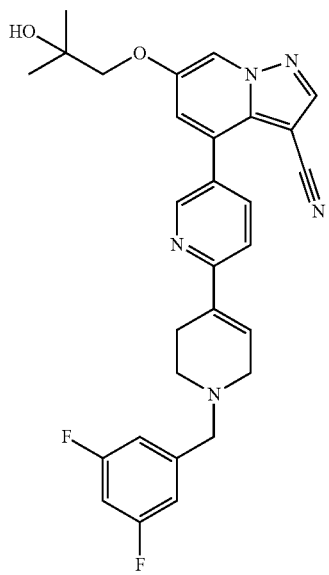 [SMILES: CC(C)(O)COc1cc(-c2ccc(C3=CCN(Cc4cc(F)cc(F)c4)CC3)nc2)c2c(C#N)cnn2c1] | 4-(1'-(3,5-difluorobenzyl)-1',2',3',6'-tetrahydro-[2,4'-bipyridin]-5-yl)-6-(2-hydroxy-2-methylpropoxy)pyrazolo[1,5-a]pyridine-3-carbonitrile |

-continued
| Compound No. | Structure | Name |
|---|---|---|
| 8 | 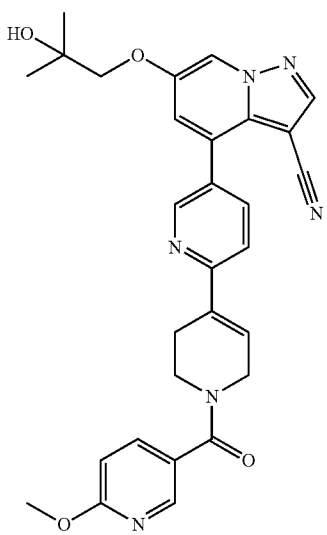 [SMILES: COc1ccc(C(=O)N2CC=C(c3ccc(-c4cc(OCC(C)(C)O)cn5ncc(C#N)c45)cn3)CC2)cn1] | 6-(2-hydroxy-2-methylpropoxy)-4-(1'-(6-methoxynicotinoyl)-1',2',3',6'-tetrahydro-[2,4'-bipyridin]-5-yl)pyrazolo[1,5-a]pyridine-3-carbonitrile |
| 9 | 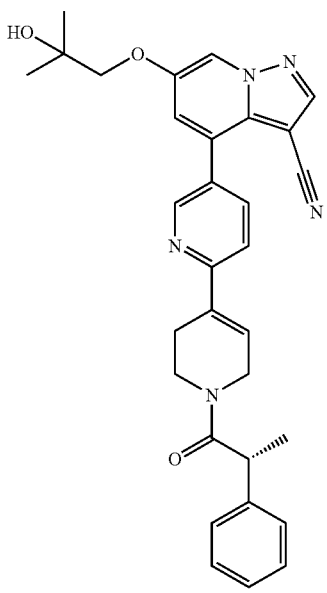 [SMILES: C[C@@H](C(=O)N1CC=C(c2ccc(-c3cc(OCC(C)(C)O)cn4ncc(C#N)c34)cn2)CC1)c1ccccc1] | (R)-6-(2-hydroxy-2-methylpropoxy)-4-(1'-(2-phenylpropanoyl)-1',2',3',6'-tetrahydro-[2,4'-bipyridin]-5-yl)pyrazolo[1,5-a]pyridine-3-carbonitrile |

| Compound No. | Structure | Name |
|---|---|---|
| 10 | 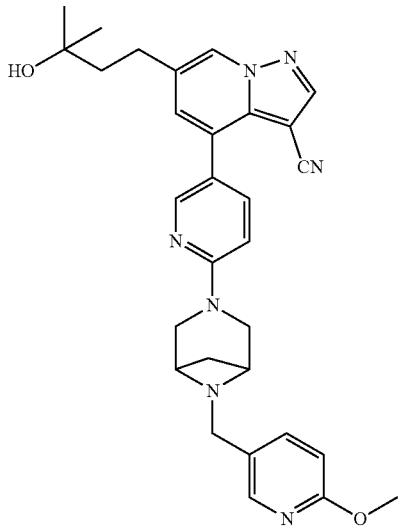 [SMILES: COc1ccc(CN2C3CC2CN(c2ccc(-c4cc(CCC(C)(C)O)cn5ncc(C#N)c45)cn2)C3)cn1] | 6-(3-hydroxy-3-methylbutyl)-4-(6-(6-((6-methoxypyridin-3-yl)methyl)-3,6-diazabicyclo[3.1.1]heptan-3-yl)pyridin-3-yl)pyrazolo[1,5-a]pyridine-3-carbonitrile |

The above typical compounds have a stereoisomer, a tautomer, or a pharmaceutically acceptable salt.

Further, the present disclosure provides a preparation method of the compound of general formula (I), or the stereoisomer, tautomer, or pharmaceutically acceptable salt thereof, including:

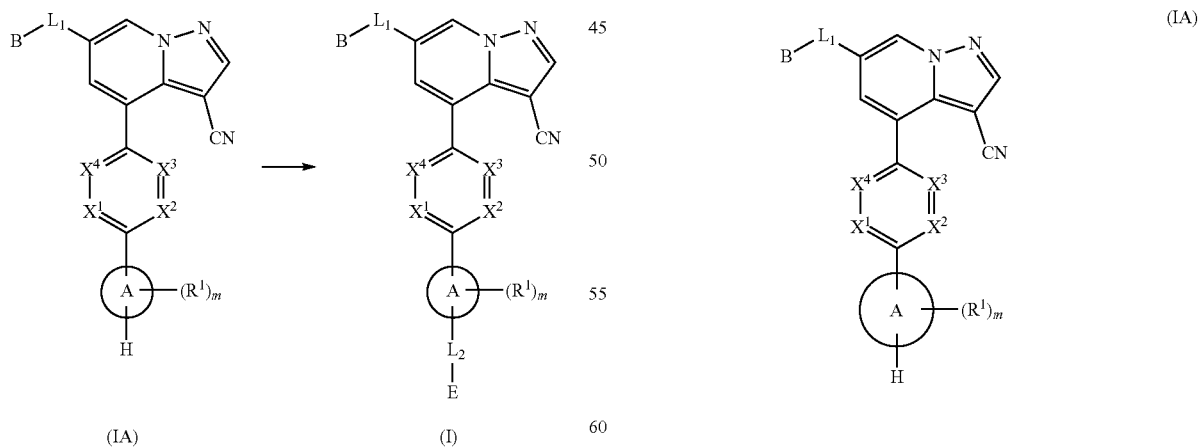

subjecting a compound of general formula (IA) to a reaction with E-(alkylene)-OMs, EC(O)X, E-(alkylene)-C(O)X, or E-C(O)H to obtain the compound of general formula (I), where X is selected from the group consisting of hydroxyl and halogen, and preferably hydroxyl, Cl, and Br; and $L_1$, $L_2$, B, E, $X^1$, $X^2$, $X^3$, $X^4$, $R^1$, and m are as defined for general formula (I).

The present disclosure provides a compound of general formula (IA), or a stereoisomer, a tautomer, or a pharmaceutically acceptable salt thereof, where $L_1$, B, $X^1$, $X^2$, $X^3$, $X^4$, $R^1$, and m are as defined for general formula (I).

Typical compounds of general formula (IA) include, but are not limited to:

| Compound No. | Structure | Name |
|---|---|---|
| 1g | | 6-(1-methyl-1H-pyrazol-4-yl)-4-(1',2',3',6'-tetrahydro-[2,4'-bipyridin]-5-yl)pyrazolo[1,5-a]pyridine-3-carbonitrile hydrogen chloride |
| | | 6-(1-methyl-1H-pyrazol-4-yl)-4-(1',2',3',6'-tetrahydro-[2,4'-bipyridin]-5-yl)pyrazolo[1,5-a]pyridine-3-carbonitrile |
| 2f | | 6-(2-hydroxy-2-methylpropoxy)-4-(1',2',3',6'-tetrahydro-[2,4'-bipyridin]-5-yl)pyrazolo[1,5-a]pyridine-3-carbonitrile hydrogen chloride |

| Compound No. | Structure | Name |
|---|---|---|
|  |  | 6-(2-hydroxy-2-methylpropoxy)-4-(1',2',3',6'-tetrahydro-[2,4-bipyridin]-5-yl)pyrazolo[1,5-a]pyridine-3-carbonitrile |
| 10i |  | 4-(6-(3,6-diazabicyclo[3.1.1]heptan-3-yl)pyridin-3-yl)-6-(3-hydroxy-3-methylbutyl)pyrazolo[1,5-a]pyridine-3-carbonitrile hydrogen chloride |
|  |  | 4-(6-(3,6-diazabicyclo[3.1.1]heptan-3-yl)pyridin-3-yl)-6-(3-hydroxy-3-methylbutyl)pyrazolo[1,5-a]pyridine-3-carbonitrile |

The above typical compounds have a stereoisomer, a tautomer, a free form, or a pharmaceutically acceptable salt.

Further, the present disclosure provides a pharmaceutical composition including an effective amount of the compound of general formula (I), (II), or (III), or the stereoisomer, tautomer, or pharmaceutically acceptable salt thereof, and a pharmaceutically acceptable carrier or an excipient, or a combination thereof.

The present disclosure provides use of the compound of general formula (I), (II), or (III), or the stereoisomer, tautomer, or pharmaceutically acceptable salt thereof, or the pharmaceutical composition in the preparation of an inhibitor drug for RET or mutant RET.

The present disclosure provides use of the compound of general formula (I), (II), or (III), or the stereoisomer, tautomer, or pharmaceutically acceptable salt thereof, or the pharmaceutical composition in the preparation of a drug for treating diseases mediated by abnormal RET, where the diseases are preferably cancer, fibro dysplasia, and genetic disorder; and the cancer is preferably non-small cell lung cancer (NSCLC), thyroid cancer, solid tumor, colon tumor, or pancreatic cancer, and more preferably NSCLC, thyroid cancer, and solid tumor.

The present disclosure provides use of the compound of general formula (I), (II), or (III), or the stereoisomer, tautomer, or pharmaceutically acceptable salt thereof, or the pharmaceutical composition in the preparation of a drug for treating subjects with antibodies to cancer.

Detailed Description of the Present Disclosure

Unless stated to the contrary, some terms used in the specification and claims of the present disclosure are defined as follows:

"Alkyl" refers to saturated aliphatic hydrocarbyl, including linear or branched saturated monovalent hydrocarbyl with 1 to 20, 1 to 10, 1 to 6, 1 to 4, 1 to 3, or 1 to 2 carbon atoms, where the alkyl can be independently and optionally substituted by one or more substituents described in the present disclosure. Specific examples of alkyl include, but are not limited to, methyl, ethyl, n-propyl, i-propyl, n-butyl, i-butyl, tert-butyl, sec-butyl, n-pentyl, 1,1-dimethylpropyl, 1,2-dimethylpropyl, 2,2-dimethylpropyl, 1-ethylpropyl, 2-methylbutyl, 3-methylbutyl, n-hexyl, 1-ethyl-2-methylpropyl, 1,1,2-trimethylpropyl, 1,1-dimethylbutyl, 1,2-dimethylbutyl, 2,2-dimethylbutyl, 1,3-dimethylbutyl, 2-ethylbutyl, 2-methylpentyl, 3-methylpentyl, 4-methylpentyl, and 2,3-dimethylbutyl. Alkyl can be optionally substituted or unsubstituted.

"Alkenyl" refers to linear or branched monovalent hydrocarbyl that has 2 to 12, 2 to 8, 2 to 6, or 2 to 4 carbon atoms and at least one sp² carbon-carbon double bond, where the alkenyl can be independently and optionally substituted by one or more substituents described in the present disclosure. Specific examples include, but are not limited to, vinyl, allyl, and butenyl. Alkenyl can be optionally substituted or unsubstituted.

"Alkynyl" refers to linear or branched monovalent hydrocarbyl that has 2 to 12, 2 to 8, 2 to 6, or 2 to 4 carbon atoms and at least one sp carbon-carbon triple bond, where the alkynyl can be independently and optionally substituted by one or more substituents described in the present disclosure. Specific examples include, but are not limited to, ethynyl, 1-propynyl, 2-propynyl, 1-butynyl, 2-butynyl, and 3-butynyl. Alkynyl can be optionally substituted or unsubstituted.

"Cycloalkyl" refers to a monocyclic or polycyclic hydrocarbon substituent that is saturated or partially unsaturated, where a cycloalkyl ring may include 3 to 20, preferably 3 to 12, and more preferably 3 to 6 carbon atoms. Non-limiting examples of monocyclic cycloalkyl include, but are not limited to, cyclopropyl, cyclobutyl, cyclopentyl, cyclopentenyl, cyclohexyl, cyclohexenyl, cyclohexadienyl, cycloheptyl, cycloheptatrienyl, and cyclooctyl; and polycyclic cycloalkyl includes spirocycloalkyl, fused cycloalkyl, and bridged cycloalkyl. Cycloalkyl can be optionally substituted or unsubstituted.

"Spirocycloalkyl" refers to a 5-18 membered polycyclic group with two or more cyclic structures, where a carbon atom (called spiro-atom) is shared between monocyclic rings, and a ring includes one or more double bonds, but none has a fully conjugated π-electron aromatic system. A ring in spirocycloalkyl may preferably be 6-14 membered and more preferably 7-10 membered. According to the number of spiro-atoms shared between rings, spirocycloalkyl may be monospirocycloalkyl, bispirocycloalkyl, or polyspirocycloalkyl, and preferably monospirocycloalkyl or bispirocycloalkyl; and may preferably be 4-membered/5-membered, 4-membered/6-membered, 5-membered/5-membered, or 5-membered/6-membered. Non-limiting examples of spirocycloalkyl include, but are not limited to:

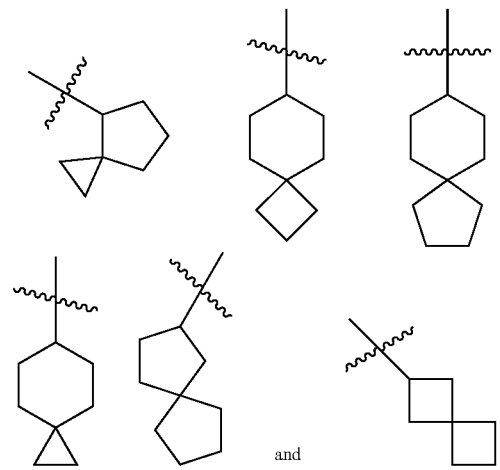

"Fused cycloalkyl" refers to a 5-18 membered all-carbon polycyclic group with two or more cyclic structures sharing a pair of carbon atoms, where one or more rings may include one or more double bonds, but none has a fully conjugated π-electron aromatic system. A ring in fused cycloalkyl may be preferably 6-12 membered and more preferably 7-10 membered. According to the number of formed rings, fused cycloalkyl may be bicyclic, tricyclic, tetracyclic, or polycyclic alkyl, preferably bicyclic or tricyclic alkyl, and more preferably 5-membered/5-membered or 5-membered/6-membered bicyclic alkyl. Non-limiting examples of fused cycloalkyl include, but are not limited to:

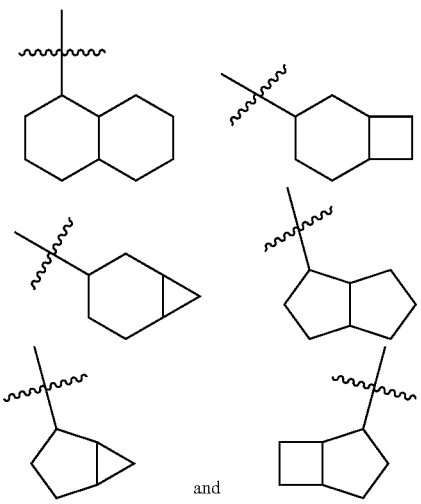

"Bridged cycloalkyl" refers to a 5-18 membered all-carbon polycyclic group with two or more cyclic structures sharing two carbon atoms that are not directly linked, where one or more rings may include one or more double bonds, but none has a fully conjugated π-electron aromatic system. A ring in bridged cycloalkyl may be preferably 6-12 membered and more preferably 7-10 membered. According to the number of formed rings, bridged cycloalkyl may be bicyclic, tricyclic, tetracyclic, or polycyclic, preferably bicyclic, tricyclic, or tetracyclic, and more preferably bicyclic or tricyclic. Non-limiting examples of bridged cycloalkyl include, but are not limited to:

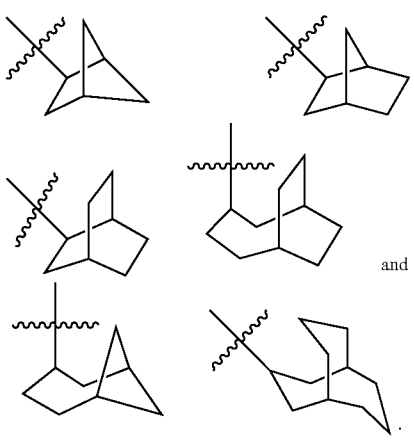

The cycloalkyl ring can be fused to an aryl, heteroaryl, or heterocyclyl ring, where a ring attached to a parent structure is cycloalkyl; and non-limiting examples include, but are not limited to, indanyl, tetrahydronaphthyl, and benzocycloheptyl.

"Alkylene" refers to divalent alkyl or divalent cycloalkyl (cycloalkylene), where the divalent alkyl may be divalent alkyl with preferably 1 to 10, more preferably 1 to 6, and further more preferably 1 to 4 carbon atoms, and the cycloalkylene may be cycloalkylene with preferably 3 to 12, more preferably 3 to 8, and most preferably 3 to 6 carbon atoms. Examples of alkylene include, but are not limited to, methylene, ethylene, —CH(CH$_3$)—, —CH(CH$_3$)$_2$—, n-propylene, cyclopropylene, cyclobutylene, and cyclopentylene. Alkylene can be substituted or unsubstituted.

"Heterocyclyl", "heterocyclic ring", and "heterocyclic" can be used interchangeably in this application, and all refer to monocyclic, bicyclic, or tricyclic non-aromatic heterocyclyl that is saturated or partially unsaturated and has 3 to 12 ring atoms, where at least one of the ring atoms is a heteroatom, such as oxygen, nitrogen, and sulfur. Heterocyclyl may preferably be 5-7 membered monocyclic heterocyclyl or 7-10 membered bicyclic or tricyclic heterocyclyl, which may include 1, 2, or 3 atoms selected from the group consisting of nitrogen, oxygen, and sulfur. Examples of "heterocyclyl" include, but are not limited to, morpholinyl, oxa-cyclobutyl, thiomorpholinyl, tetrahydropyranyl, 1,1-dioxo-thiomorpholinyl, piperidyl, 2-oxo-piperidyl, pyrrolidinyl, 2-oxo-pyrrolidinyl, piperazin-2-one, 8-oxa-3-aza-bicyclo[3.2.1]octyl, and piperazinyl. The heterocyclyl ring may be fused to an aryl, heteroaryl, or cycloalkyl ring, where a ring attached to a parent structure is heterocyclyl. Heterocyclyl can be optionally substituted or unsubstituted.

"Spiroheterocyclyl" refers to a 5-18 membered polycyclic group with two or more cyclic structures, where an atom is shared between monocyclic rings; a ring includes one or more double bonds, but none has a fully conjugated π-electron aromatic system; and one or more ring atoms are heteroatoms selected from the group consisting of nitrogen, oxygen, sulfur, and S(O)$_m$, and the remaining ring atoms are carbon. A ring in spiroheterocyclyl may preferably be 6-14 membered and more preferably 7-10 membered. According to the number of spiro-atoms shared between rings, spiroheterocyclyl may be monospiroheterocyclyl, bispiroheterocyclyl, or polyspiroheterocyclyl, and preferably monospiroheterocyclyl or bispiroheterocyclyl. More preferably, spiroheterocyclyl may be 4-membered/4-membered, 4-membered/5-membered, 4-membered/6-membered, 5-membered/5-membered, or 5-membered/6-membered monospiroheterocyclyl. Non-limiting examples of spiroheterocyclyl include, but are not limited to:

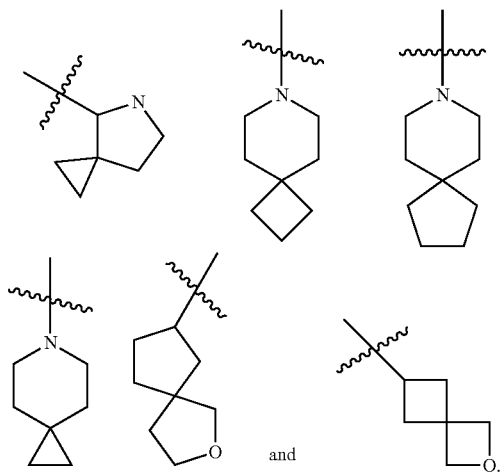

"Fused heterocyclyl" refers to an all-carbon polycyclic group with two or more cyclic structures sharing a pair of atoms, where one or more rings may include one or more double bonds, but none has a fully conjugated π-electron aromatic system; and one or more ring atoms are heteroatoms selected from the group consisting of nitrogen, oxygen, sulfur, and S(O)$_m$, and the remaining ring atoms are carbon. A ring in fused heterocyclyl may preferably be 6-14 membered and more preferably 7-10 membered. According to the number of formed rings, fused heterocyclyl may be bicyclic, tricyclic, tetracyclic, or polycyclic fused heterocyclyl, preferably bicyclic or tricyclic fused heterocyclyl, and more preferably 5-membered/5-membered or 5-membered/6-membered bicyclic fused heterocyclyl. Non-limiting examples of fused heterocyclyl include, but are not limited to:

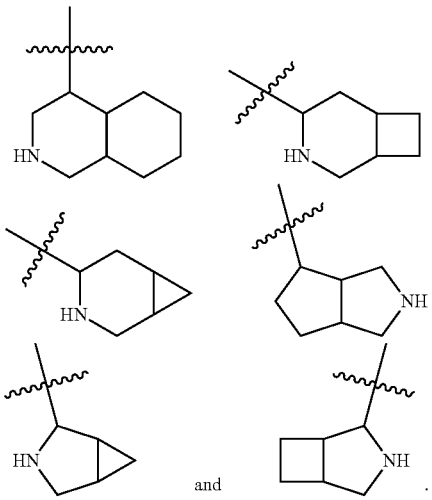

"Bridged heterocyclyl" refers to a 5-18 membered polycyclic group with two or more cyclic structures sharing two atoms that are not directly linked, where one or more rings may include one or more double bonds, but none has a fully conjugated π-electron aromatic system; and one or more ring atoms are heteroatoms selected from the group consisting of nitrogen, oxygen, sulfur, and S(O)$_m$, and the remaining ring atoms are carbon. A ring in bridged heterocyclyl may preferably be 6-14 membered and more preferably 7-10 membered. According to the number of formed rings, bridged heterocyclyl may be bicyclic, tricyclic, tetracyclic, or polycyclic, preferably bicyclic, tricyclic, or tetracyclic, and more preferably bicyclic or tricyclic. Non-limiting examples of bridged heterocyclyl include, but are not limited to:

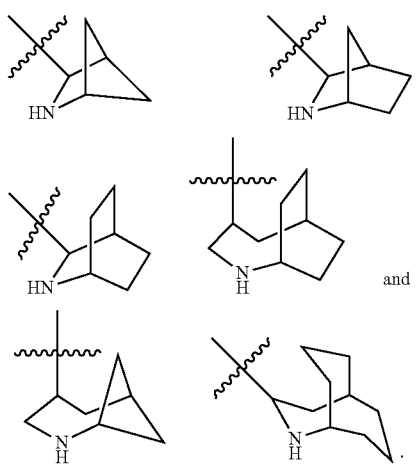

"Aryl" refers to a carbocyclic aromatic system with one or two rings, where the rings can be fused together. Aryl may include aromatic groups such as phenyl, naphthyl, and tetrahydronaphthyl. Aryl may be preferably $C_6$-$C_{10}$ aryl, more preferably phenyl and naphthyl, and most preferably phenyl. Aryl can be substituted or unsubstituted. Aryl can be fused to heteroaryl, heterocyclyl, or cycloalkyl, where a structure attached a parent structure is an aryl ring; and non-limiting examples include, but are not limited to:

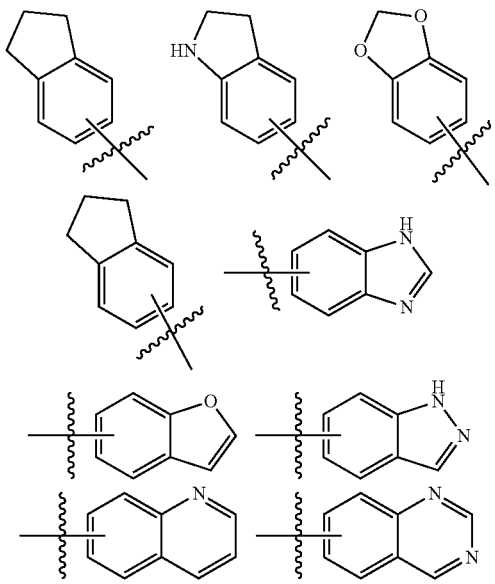

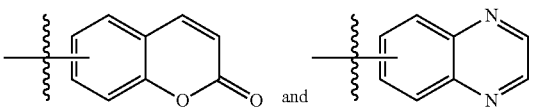

"Heteroaryl" refers to an aromatic 5-6 membered monocyclic ring or 9-10 membered bicyclic ring, which may include 1 to 4 atoms selected from the group consisting of nitrogen, oxygen, and sulfur. Examples of heteroaryl include, but are not limited to, furyl, pyridyl, 2-oxo-1,2-dihydropyridyl, pyridazinyl, pyrimidinyl, pyrazinyl, thienyl, isoxazolyl, oxazolyl, oxadiazolyl, imidazolyl, pyrrolyl, pyrazolyl, triazolyl, tetrazolyl, thiazolyl, isothiazolyl, 1,2,3-thiadiazolyl, benzodioxolyl, benzimidazolyl, indolyl, isoindolyl, 1,3-dioxo-isoindolyl, quinolyl, indazolyl, benzisothiazolyl, benzoxazolyl, and benzisoxazolyl. Heteroaryl can be optionally substituted or unsubstituted. The heteroaryl ring can be fused to an aryl, heterocyclyl, or cycloalkyl ring, where a ring attached to a parent structure is the heteroaryl ring; and non-limiting examples include, but are not limited to:

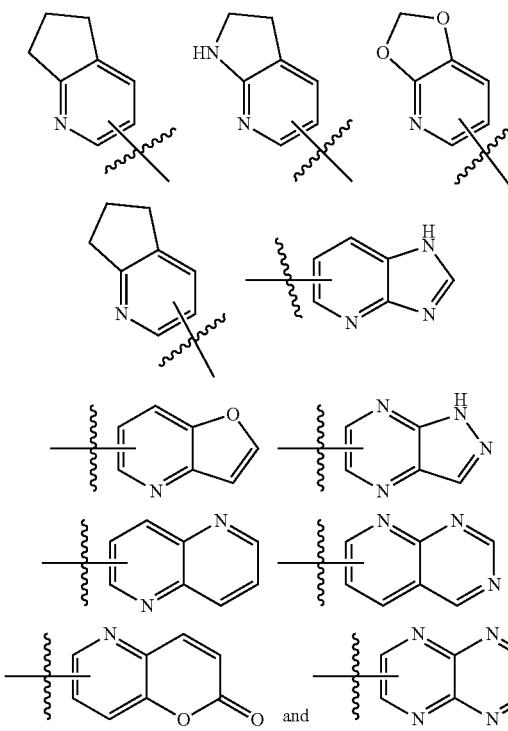

"Alkoxy" refers to alkyl-O—, where the alkyl is as defined in this application. $C_1$-$C_6$ alkoxy may be preferred. Examples of alkoxy include, but are not limited to: methoxy, ethoxy, n-propoxy, i-propoxy, n-butoxy, i-butoxy, and tert-butoxy.

"Haloalkyl" refers to alkyl with one or more halogen substituents, where the alkyl has the meaning as described in the present disclosure. Examples of haloalkyl include, but are not limited to, fluoromethyl, difluoromethyl, trifluoromethyl, perfluoroethyl, 1,1-dichloroethyl, and 1,2-dichloropropyl.

"Hydroxy" refers to —OH.

"Halogen" refers to fluorine, chlorine, bromine, and iodine.

"Amino" refers to —NH$_2$.

"Cyano" refers to —CN.

"Nitro" refers to —NO$_2$.

"Benzyl" refers to —CH$_2$-phenyl.

"Carboxyl" refers to —C(O)OH.

"Acetyl" refers to —C(O)CH$_3$ or Ac.

"Tf" refers to trifluoromethanesulfonyl.

"Ms" refers to methanesulfonyl.

"Boronate" refers to —B(OH)$_2$.

"Borate" refers to —B[O(alkyl) or (cycloalkyl)][O(alkyl) or (cycloalkyl)], where two alkyl groups, together with O atoms attached thereto, may form 5-6 membered heterocyclyl, and the 5-6 membered heterocyclyl may be optionally further substituted.

"Carboxylate" refers to —C(O)O(alkyl) or (cycloalkyl), where the alkyl and cycloalkyl are as defined above.

The term "substituted" means that one or more (preferably 5 at most, and more preferably 1 to 3) hydrogen atoms in a group are each independently substituted with a corresponding number of substituents. It goes without saying that a substituent is only in its possible chemical position, and those skilled in the art will be able to determine (through experiments or theories) possible or impossible substitution without undue efforts. For example, it may be unstable when amino or hydroxyl with free hydrogen is bound to a carbon atom with an unsaturated bond (such as olefin).

Unless otherwise specified, the "substituted" mentioned in this specification means that a group can be substituted with one or more groups selected from the group consisting of alkyl, alkenyl, alkynyl, alkoxy, alkylthio, alkylamino, halogen, mercapto, hydroxyl, nitro, cyano, cycloalkyl, heterocyclyl, aryl, heteroaryl, cycloalkoxy, heterocycloalkoxy, cycloalkylthio, heterocycloalkylthio, amino, haloalkyl, hydroxyalkyl, carboxyl, carboxylate, =O, —NR$^2$R$^3$, —C(O)NR$^2$R$^3$, —C(O)R$^4$, —OC(O)R$^4$, —NR$^2$C(O)R$^3$, and —SO$_2$NR$^2$R$^3$, where R$^2$, R$^3$, and R$^4$ are as defined for general formula (I).

Definitions and conventions of stereochemistry in the present disclosure generally refer to the following references:

S. P. Parker, Ed., McGraw-Hill Dictionary of Chemical Terms (1984) McGraw-HillBook Company, New York; and Eliel, E. and Wilen, S., "Stereochemistry of Organic Compounds", John Wiley & Sons, Inc., New York, 1994. The compounds of the present disclosure may include an asymmetric center or a chiral center, and thus there are different stereoisomers. All stereoisomeric forms of the compounds of the present disclosure include, but are not limited to, diastereomers, enantiomers, atropisomers, and a mixture thereof, such as a racemic mixture, which constitute a part of the present disclosure. A diastereomeric mixture can be separated into individual diastereomers by a method such as chromatography, crystallization, distillation, or sublimation based on physical and chemical differences. An enantiomeric mixture can be converted into a diastereomeric mixture by reacting with a suitable optically active compound (such as a chiral auxiliary, such as chiral alcohol or Mosher's acid chloride), the diastereomeric mixture can be separated into individual diastereomers, and the individual diastereomers can be converted into corresponding pure enantiomers. The intermediates and compounds of the present disclosure may also exist in different tautomeric forms, and all such forms are included in the scope of the present disclosure. Many organic compounds exist in an optically active form, that is, the organic compounds have the ability to rotate a plane of plane polarized light. In the description of optically active compounds, prefixes D, L or R, S are used to indicate an absolute configuration of a molecular chiral center. Prefixes d, l or (+), (−) are symbols for naming plane-polarized light rotation, where (−) or l indicates a left-handed rotation of a compound and (+) or d indicates a right-handed rotation of a compound. Atoms or atomic groups of these stereoisomers are linked to each other in the same order, but have different stereostructures. A specific stereoisomer may be an enantiomer, and a mixture of the isomers is usually called an enantiomeric mixture. A 50:50 enantiomeric mixture is called racemic mixture or racemate, which may result in the lack of stereoselectivity or stereospecificity in a chemical reaction process. The terms "racemic mixture" and "racemate" refer to an equimolar mixture of two enantiomers, which lacks optical activity.

"Tautomers" or "tautomeric forms" mean that isomers of different energy structures can be converted into each other at a low energy barrier. For example, proton tautomerism (i.e., tautomerism of proton transfer) includes tautomerization through proton transfer, such as isomerization of keto-enol and imine-enamine. Atomic (valence) tautomerism includes tautomerization of recombined bonding electrons. Unless otherwise indicated, the structural formulas described in the present disclosure include all isomeric forms (such as enantiomers, diastereomers, and geometric isomers): for example, R and S configurations with an asymmetric center, (Z) and (E) isomers of the double bond, and (Z) and (E) conformational isomers. Therefore, a single chemical stereoisomer of the compound of the present disclosure or a mixture of enantiomers, diastereomers, or geometric isomers thereof all fall within the scope of the present disclosure.

Synthetic Method of the Compounds of the Present Disclosure

In order to achieve the objective of the present disclosure, the present disclosure adopts the following technical solutions:

The present disclosure provides a preparation method of a compound of general formula (ID), or a stereoisomer, a tautomer, or a pharmaceutically acceptable salt thereof, including the following step:

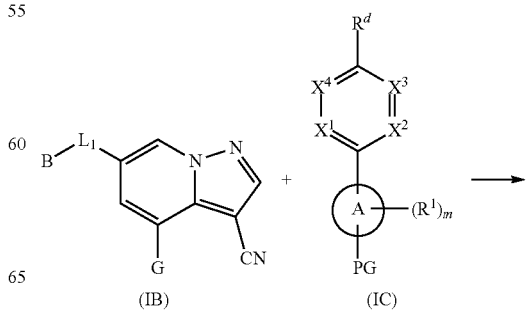

-continued

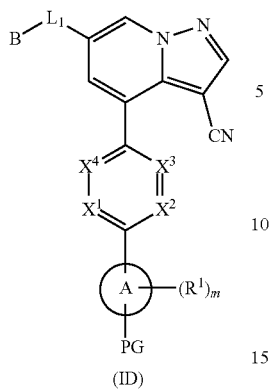

(ID)

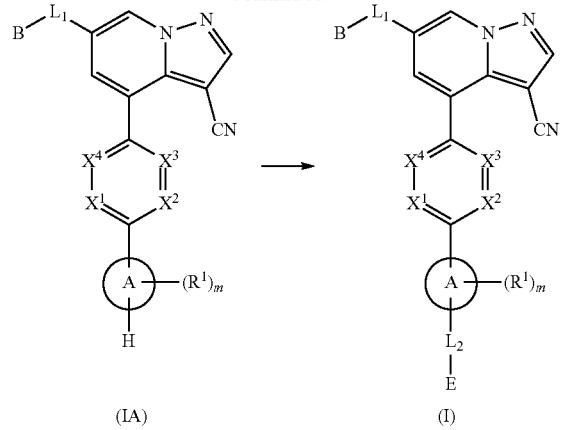

(IA)        (I)

subjecting a compound of general formula (IB) and a compound of general formula (IC) to a coupling reaction in the presence of a palladium catalyst to obtain the compound of general formula (ID);

where $R^a$ is selected from the group consisting of boronate or borate; and the borate may preferably be:

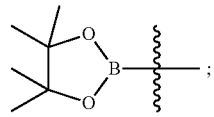 [SMILES: *B1OC(C)(C)C(C)(C)O1]

G is a leaving group and preferably selected from the group consisting of halogen and trifluoromethanesulfonyloxy, and the halogen may be preferably Cl or Br;

PG is a protecting group of N, which may preferably be tert-butoxycarbonyl;

the palladium catalyst is [1,1'-bis(diphenylphosphino)ferrocene]palladium dichloride or tetrakis(triphenylphosphine) palladium;

$L_1$, $L_2$, B, E, $X^1$, $X^2$, $X^3$, $X^4$, $R^1$, and m are as defined for general formula (I).

The present disclosure provides a preparation method of a compound of general formula (I), or a stereoisomer, a tautomer, or a pharmaceutically acceptable salt thereof, including the following step:

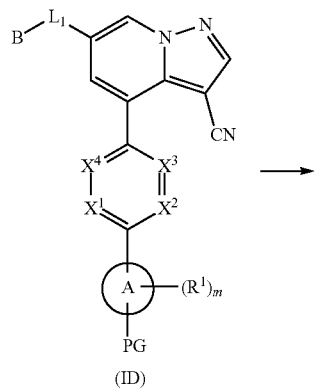

(ID)

removing the protecting group PG from the compound of general formula (ID) to obtain a compound of general formula (IA), and subjecting the compound of general formula (IA) to a reaction with E-(alkylene)-OMs, EC(O)X, E-(alkylene)-C(O)X, or E-C(O)H to obtain the compound of general formula (I), where PG is a protecting group of N, which may preferably be tert-butoxycarbonyl;

where X is selected from the group consisting of hydroxyl and halogen, and preferably hydroxyl, Cl, and Br; and $L_1$, $L_2$, B, E, $X^1$, $X^2$, $X^3$, $X^4$, $R^1$, and m are as defined for general formula (I).

DETAILED DESCRIPTION OF THE EMBODIMENTS

The present disclosure is further described below with reference to examples, but these examples do not limit the scope of the present disclosure.

EXAMPLES

Preparation of representative compounds of formula (I) and related structural identification data are shown in the examples. It must be noted that the following examples are provided to illustrate the present disclosure, rather than limit the present disclosure. $^1$H NMR spectra are obtained from determination by a Bruker instrument (400 MHZ), and a chemical shift is expressed in ppm. Tetramethylsilane (TMS) is used as an internal standard (0.00 ppm). Expression method of $^1$H NMR: s=singlet, d=doublet, t=triplet, q=quartet, m=multiplet, br=broadened, dd=doublet of doublets, and dt=doublet of triplets. A coupling constant is expressed in a unit of Hz.

Mass spectra are obtained from determination by an LC/MS instrument, and an ionization method can be ESI or APCI.

Yantai Yellow Sea HSGF254 or Qingdao GF254 silica gel plate is adopted as a thin layer chromatography (TLC) silica gel plate. The silica gel plate used for TLC has a specification of 0.15 mm to 0.2 mm, and a TLC silica gel plate used for the separation and purification of a product has a specification of 0.4 mm to 0.5 mm.

Yantai Yellow Sea silica gel of 200 to 300 mesh is generally used as a carrier in column chromatography.

In the following examples, unless otherwise specified, all temperatures are expressed in ° C. Unless otherwise specified, various starting materials and reagents are commercially available or synthesized according to known methods. Commercially available raw materials and reagents can be directly used without being further purified. Unless otherwise specified, manufacturers of the commercially available raw materials and reagents include, but are not limited to, Aldrich Chemical Company, ABCR GmbH & Co. KG, Acros Organics, Guangzan Chemical Technology Co., Ltd., and Jingyan Chemical Technology Co., Ltd.

CD$_3$OD: deuterated methanol

CDCl$_3$: deuterated chloroform

DMSO-$d_6$: deuterated dimethyl sulfoxide

An argon atmosphere is provided by connecting a reaction vessel to an argon balloon with a volume of about 1 L.

In the examples, unless otherwise specified, a solution in a reaction refers to an aqueous solution.

A compound is purified by silica gel column chromatography and TLC, where an eluent or developing solvent system is selected from the group consisting of: A: petroleum ether and ethyl acetate system; B: dichloromethane (DCM) and methanol system; and C: DCM: ethyl acetate; and a volume ratio of a solvent varies according to the polarity of a compound, and may also be adjusted by adding a small amount of an acidic or alkaline reagent, such as acetic acid or triethylamine (TEA).

Example 1

4-(1'-((6-methoxypyridin-3-yl)methyl)-1',2',3',6'-tetrahydro-[2,4'-bipyridin]-5-yl)-6-(1-methyl-1H-pyrazol-4-yl)pyrazolo[1,5-a]pyridine-3-carbonitrile
1

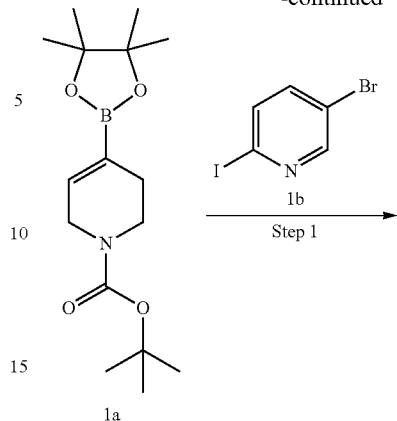

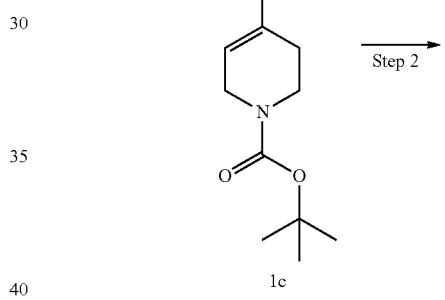

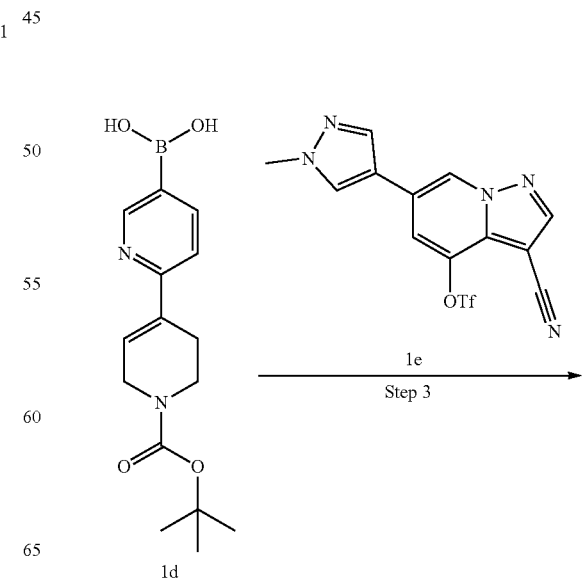

-continued

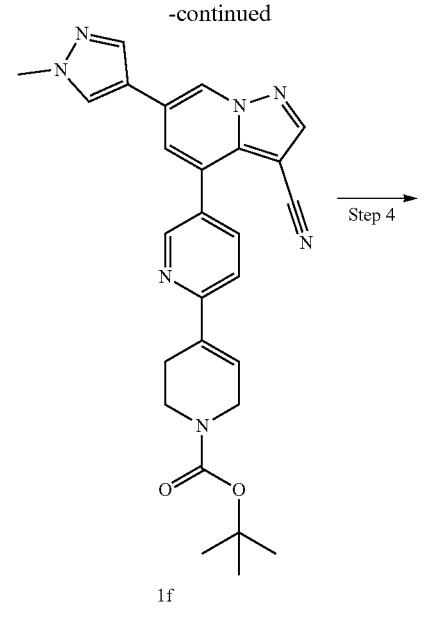

1f

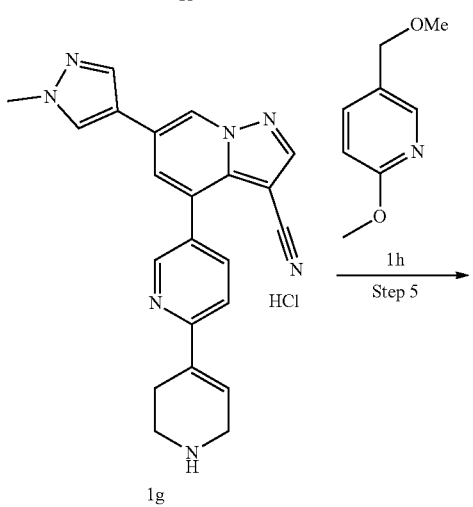

1g

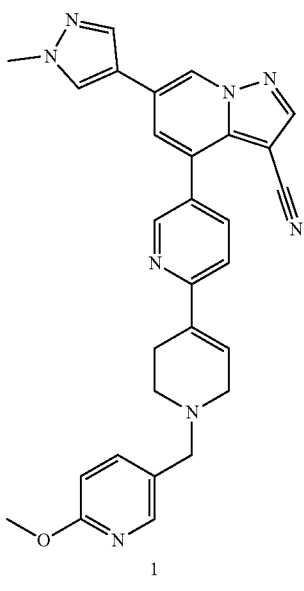

1

Step 4 →

Step 5 →

1h

HCl

Step 1 tert-butyl 5-bromo-3',6'-dihydro-[2,4'-bipyridine]-1'(2'H)-carboxylate 1c tert-butyl 4-(4,4,5,5-tetramethyl-1,3,2-dioxaboran-2-yl)-3,6-dihydropyridin-1(2H)-carboxylate 1a (5 g, 16.18 mmol, prepared by the method disclosed in the patent application "WO2003092686") was added to a 250 mL three-necked flask, then 5-bromo-2-iodopyridine 1b (4.58 g, 16.18 mmol), dioxane (162 mL), water (20 mL), sodium carbonate (5.15 g, 48.54 mmol), and [1,1'-bis(diphenylphosphino) ferrocene]palladium dichloride (1.18 g, 1.62 mmol) were added successively, and a resulting reaction solution was heated to 80° C. and reacted for 4 h. The reaction solution was cooled to room temperature, dioxane was removed through rotary evaporation, and 150 mL of water was added. Extraction was conducted with ethyl acetate (50 mL×3), a resulting organic phase was washed with a saturated sodium chloride solution (50 mL), dried over anhydrous sodium sulfate, filtered, and concentrated under reduced pressure, and a residue was purified by silica gel column chromatography (eluent: system A) to obtain tert-butyl 5-bromo-3',6'-dihydro-[2,4'-bipyridine]-1'(2'H)-carboxylate 1c (2.82 g, white solid), with a yield of 54%.

MS m/z (ESI): 339.1 [M+1]

Step 2

(1'-(tert-butoxycarbonyl)-1',2',3',6'-tetrahydro-[2,4'-bipyridin]-5-yl) boronic acid 1d Tert-butyl 5-bromo-3',6'-dihydro-[2,4'-bipyridine]-1'(2'H)-carboxylate 1c (2.82 g, 8.3 mmol) was added to a 250 mL three-necked flask, then bis(pinacolato)diboron (2.54 g, 10 mmol), 100 mL of dioxane, 15 mL of water, potassium acetate (2.44 g, 24.9 mmol), and [1,1'-bis(diphenylphosphino) ferrocene]palladium dichloride (607 mg, 0.83 mmol) were added successively, and a resulting reaction solution was heated to 100° C. and reacted for 7 h. The reaction solution was cooled to room temperature, dioxane was removed through rotary evaporation, and 150 mL of water was added. Extraction was conducted with ethyl acetate (40 mL×3), a resulting organic phase was washed with a saturated sodium chloride solution (30 mL), dried over anhydrous sodium sulfate, filtered, and concentrated under reduced pressure, and a residue was purified by silica gel column chromatography (eluent: system C) to obtain (1'-(tert-butoxycarbonyl)-1',2',3',6'-tetrahydro-[2,4'-bipyridin]-5-yl) boronic acid 1d (936 mg, light-brown solid), with a yield of 37%.

MS m/z (ESI): 305.1 [M+1]

Step 3 tert-butyl 5-(3-cyano-6-(1-methyl-1H-pyrazol-4-yl)pyrazolo[1,5-a]pyridin-4-yl)-3',6'-dihydro-[2,4'-bipyridine]-1'(2'H)-carboxylate 1f (1'-(tert-butoxycarbonyl)-1',2',3',6'-tetrahydro-[2,4'-bipyridin]-5-yl) boronic acid 1d (100 mg, 0.33 mmol) was added to a 50 mL three-necked flask, then 3-cyano-6-(1-methyl-1H-pyrazol-4-yl)pyrazolo[1,5-a]pyridin- 4-yl trifluoromethanesulfonate 1e (146 mg, 0.39 mmol, prepared by the method disclosed in the patent application "WO2017011776"), 5 mL of dioxane, 15 mL of water, sodium carbonate (70 mg, 0.66 mmol), and [1,1'-bis(diphenylphosphino) ferrocene]palladium dichloride (24 mg, 0.03 mmol) were added successively, and a resulting reaction solution was heated to 100° C. and reacted for 6 h. The reaction solution was cooled to room temperature, dioxane was removed through rotary evaporation, and 30 mL of water was added. Extraction was conducted with ethyl acetate (20 mL×3), a resulting organic phase was washed with a saturated sodium chloride solution (20 mL), dried over anhydrous sodium sulfate, filtered, and concentrated under reduced pressure, and a residue was purified by silica gel column chromatography (eluent: system A) to obtain tert-butyl 5-(3-cyano-6-(1-methyl-1H-pyrazol-4-yl)pyrazolo[1,5-a]pyridin-4-yl)-3',6'-dihydro-[2,4'-bipyridine]-1'(2'H)-carboxylate 1f (97 mg, light-yellow solid), with a yield of 61%.

MS m/z (ESI): 481.6 [M+1]

Step 4

6-(1-methyl-1H-pyrazol-4-yl)-4-(1',2',3',6'-tetrahydro-[2,4'-bipyridin]-5-yl)pyrazolo[1,5-a]pyridine-3-carbonitrile 1g Tert-butyl 5-(3-cyano-6-(1-methyl-1H-pyrazol-4-yl)pyrazolo[1,5-a]pyridin-4-yl)-3',6'-dihydro-[2,4'-bipyridine]-1'(2'H)-carboxylate 1f (650 mg, 1.35 mmol) was added to a 50 mL single-necked flask, then a 4 N hydrochloric acid/dioxane solution (10 mL) was added, and a resulting reaction solution was heated to 30° C. and reacted for 4 h. The reaction solution was concentrated under reduced pressure to obtain 6-(1-methyl-1H-pyrazol-4-yl)-4-(1',2',3',6'-tetrahydro-[2,4'-bipyridin]-5-yl)pyrazolo[1,5-a]pyridine-3-carbonitrile 1 g (514.8 mg, yellow solid), which would be directly used in the next step.

MS m/z (ESI): 381.4 [M+1]

Step 5

4-(1'-((6-methoxypyridin-3-yl)methyl)-1',2',3',6'-tetrahydro-[2,4'-bipyridin]-5-yl)-6-(1-methyl-1H-pyrazol-4-yl)pyrazolo[1,5-a]pyridine-3-carbonitrile 1

6-(1-methyl-1H-pyrazol-4-yl)-4-(1',2',3',6'-tetrahydro-[2,4'-bipyridin]-5-yl)pyrazolo[1,5-a]pyridine-3-carbonitrile 1 g (100 mg, 0.26 mmol) was added to a 25 mL single-necked flask, then 5 mL of N,N-dimethylformamide (DMF), N,N-diisopropylethylamine (DIPEA) (339 mg, 2.62 mmol), and (6-methoxypyridin-3-yl)methyl methanesulfonate 1h (171 mg, 0.79 mmol, prepared by the method disclosed in the patent application "WO2014066659") were added successively, and a resulting reaction solution was heated to 70° C. and reacted for 6 h. The reaction solution was cooled to room temperature, 50 mL of ethyl acetate was added, and a resulting organic phase was washed successively with water (20 mL×3) and a saturated sodium chloride solution (20 mL), dried over anhydrous sodium sulfate, filtered, and concentrated under reduced pressure, and a residue was purified by TLC (eluent: system B) to obtain 4-(1'-((6-methoxypyridin-3-yl)methyl)-1',2',3',6'-tetrahydro-[2,4'-bipyridin]-5-yl)-6-(1-methyl-1H-pyrazol-4-yl)pyrazolo[1,5-a]pyridine-3-carbonitrile 1 (34 mg, light-yellow solid), with a yield of 25%.

MS m/z (ESI): 503.3 [M+1]

$^1$H NMR (400 MHZ, DMSO): δ 9.32 (d, J=1.4 Hz, 1H), 8.79 (d, J=1.9 Hz, 1H), 8.68 (s, 1H), 8.41 (s, 1H), 8.14 (s, 1H), 8.11 (s, 1H), 8.07-8.03 (m, 1H), 7.92 (d, J=1.4 Hz, 1H), 7.70 (d, J=8.2 Hz, 2H), 6.85-6.79 (m, 2H), 3.88 (s, 3H), 3.85 (s, 3H), 3.58 (s, 2H), 3.17 (d, J=5.3 Hz, 2H), 2.70-2.61 (m, 4H).

Example 2

6-(2-hydroxy-2-methylpropoxy)-4-(1'-((6-methoxypyridin-3-yl)methyl)-1',2',3',6'-tetrahydro-[2,4'-bipyridin]-5-yl)pyrazolo[1,5-a]pyridine-3-carbonitrile 2

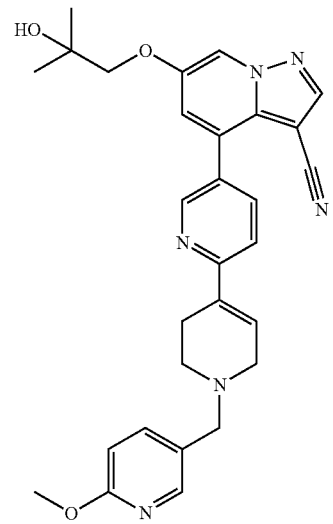

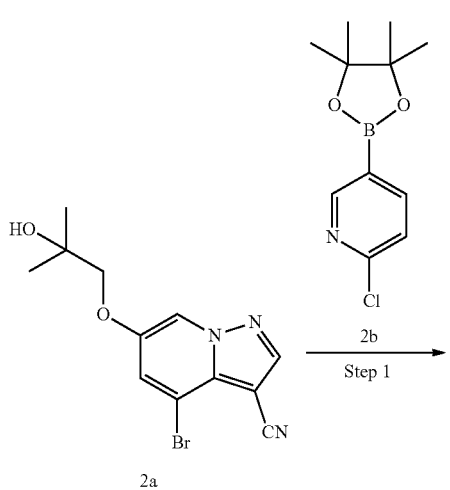

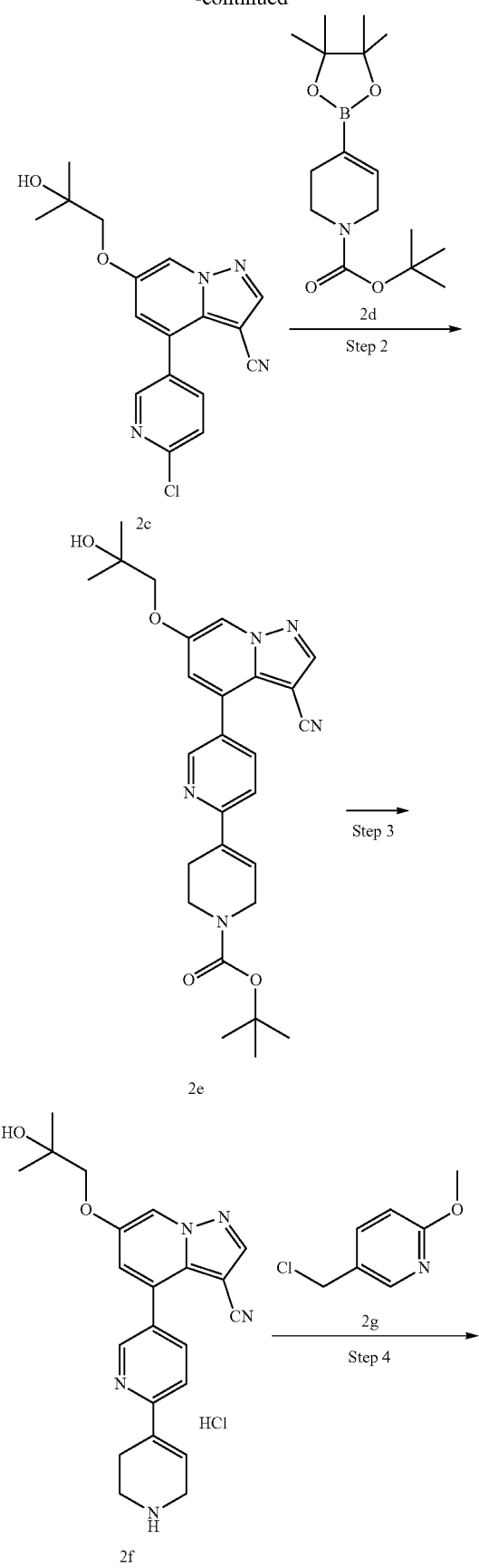

Step 1

4-(6-chloropyridin-3-yl)-6-(2-hydroxy-2-methyl-propoxy) pyrazolo[1,5-a]pyridine-3-carbonitrile 2c 4-bromo-6-(2-hydroxy-2-methylpropoxy) pyrazolo[1,5-a]pyridine-3-carbonitrile 2a (1.6 g, 5.12 mmol, prepared by the method disclosed in the patent application "WO2018071447") was added to a 100 mL three-necked flask, then 35 mL of DMF, 2-chloropyridine-5-boronic acid pinacol ester 2b (1.6 g, 6.7 mmol), potassium phosphate (5.7 g, 27.1 mmol), and tetrakis(triphenylphosphine) palladium (0.295 g, 0.26 mmol) were added successively, and a resulting reaction solution was heated to 95° C. and reacted for 16 h. The reaction solution was cooled to room temperature, and 70 mL of water was added. Extraction was conducted with a mixture of DCM and methanol (V:V=10:1, 100 mL×3), a resulting organic phase was dried over anhydrous sodium sulfate, filtered, and concentrated under reduced pressure, and a residue was purified by silica gel column chromatography (eluent: system A) to obtain 4-(6-chloro-pyridin-3-yl)-6-(2-hydroxy-2-methylpropoxy) pyrazolo[1,5-a]pyridine-3-carbonitrile 2c (1.26 g, yellow solid), with a yield of 72%.

MS m/z (ESI): 343.0 [M+1]

Step 2 tert-butyl 5-(3-cyano-6-(2-hydroxy-2-methyl-propoxy) pyrazolo[1,5-a]pyridin-4-yl)-3',6'-dihydro-[2,4'-bipyridine]-1'(2'H)-carboxylate 2e 12 mL of 1,4-dioxane, 3 mL of water, 4-(6-chloropyridin-3-yl)-6-(2-hydroxy-2-methylpropoxy) pyrazolo[1,5-a]pyridine-3-carbonitrile 2c (0.5 g, 1.46 mmol), tert-butyl 4-(4,4,5,5-tetramethyl-1,3,2-dioxaboran-2-yl)-3,6-dihydropyridin-1 (2H)-methyl carboxylate 2d (0.74 g, 2.39 mmol), sodium carbonate (0.419 g, 3.9 mmol), and tetrakis (triphenylphosphine) palladium (0.2 mg, 0.13 mmol) were added successively to a 25 mL microwave tube, and a resulting reaction solution was heated to 110° C. and subjected to a microwave reaction for 1.5 h. The reaction solution was cooled to room temperature, and 30 mL of water was added. Extraction was conducted with ethyl acetate (30 mL×3), a resulting organic phase was dried over anhydrous sodium sulfate, filtered, and concentrated under reduced pressure, and a residue was purified by silica gel column chromatography (eluent: system A) to obtain tert-butyl 5-(3-cyano-6-(2-hydroxy-2-methylpropoxy) pyrazolo[1,5-a]pyridin-4-yl)-3',6'-dihydro-[2,4'-bipyridine]-1'(2'H)-carboxylate 2e (460 mg, yellow solid), with a yield of 62.6%.

MS m/z (ESI): 490.0 [M+1]

Step 3

6-(2-hydroxy-2-methylpropoxy)-4-(1',2',3',6'-tetrahydro-[2,4'-bipyridin]-5-yl)pyrazolo[1,5-a]pyridine-3-carbonitrile hydrogen chloride 2f Tert-butyl 5-(3-cyano-6-(2-hydroxy-2-methylpropoxy) pyrazolo[1,5-a]pyridin-4-yl)-3',6'-dihydro-[2,4'-bipyridine]-1'(2'H)-carboxylate 2e (460 mg, 0.94 mmol) was added to a 100 ml three-necked flask, then 30 mL of DCM and 10 mL of a 4 N hydrochloric acid/dioxane solution were added successively, and a resulting reaction solution reacted at room temperature for 4 h. The reaction solution was concentrated under reduced pressure to obtain 6-(2-hydroxy-2-methylpropoxy)-4-(1',2',3',6'-tetrahydro-[2,4'-bipyridin]-5-yl)pyrazolo[1,5-a]pyridine-3-carbonitrile hydrogen chloride 2f (441 mg, light-yellow solid), which would be directly used in the next step.

MS m/z (ESI): 390.0 [M+1]

Step 4

6-(2-hydroxy-2-methylpropoxy)-4-(1'-((6-methoxypyridin-3-yl)methyl)-1',2',3',6'-tetrahydro-[2,4'-bipyridin]-5-yl)pyrazolo[1,5-a]pyridine-3-carbonitrile 2

6-(2-hydroxy-2-methylpropoxy)-4-(1',2',3',6'-tetrahydro-[2,4'-bipyridin]-5-yl)pyrazolo[1,5-a]pyridine-3-carbonitrile hydrogen chloride 2f (120 mg, 0.31 mmol) was added to a 10 mL three-necked flask, then 3 mL of acetonitrile, cesium carbonate (200 mg, 0.61 mmol), and 5-(chloromethyl)-2-methoxypyridine 2g (148 mg, 0.86 mmol, prepared by the method disclosed in the patent application "WO2016033445") were added successively, and a resulting reaction solution was heated to 75° C. and reacted for 1.5 h. The reaction solution was cooled to room temperature, 100 ml of water was added, and a resulting mixture was stirred and filtered. A resulting filter cake was dissolved with ethyl acetate (30 mL), dried over anhydrous sodium sulfate, filtered, and concentrated under reduced pressure, and a residue was subjected to recrystallization with acetonitrile to obtain 6-(2-hydroxy-2-methylpropoxy)-4-(1'-((6-methoxypyridin-3-yl)methyl)-1',2',3',6'-tetrahydro-[2,4'-bipyridin]-5-yl)pyrazolo[1,5-a]pyridine-3-carbonitrile 2 (50 mg, gray solid), with a yield of 33.3%. 1

MS m/z (ESI): 511.2 [M+1]

$^1$H NMR (400 MHZ, DMSO): δ 12.24-12.19 (m, 1H), 8.75 (dd, J=8.2, 2.1 Hz, 2H), 8.60 (s, 1H), 8.11 (d, J=2.0 Hz, 1H), 7.99 (dt, J=15.9, 7.9 Hz, 1H), 7.73-7.63 (m, 2H), 7.44 (d, J=2.0 Hz, 1H), 6.81 (t, J=5.7 Hz, 2H), 4.72 (s, 1H), 3.89 (s, 2H), 3.85 (s, 3H), 3.57 (s, 2H), 3.15 (d, J=2.4 Hz, 2H), 2.67 (d, J=4.9 Hz, 2H), 2.62 (s, 2H), 1.23 (s, 6H).

Example 3

6-(2-hydroxy-2-methylpropoxy)-4-(1'-((5-methoxy-pyridin-2-yl)methyl)-1',2',3',6'-tetrahydro-[2,4'-bipyridin]-5-yl)pyrazolo[1,5-a]pyridine-3-carbonitrile

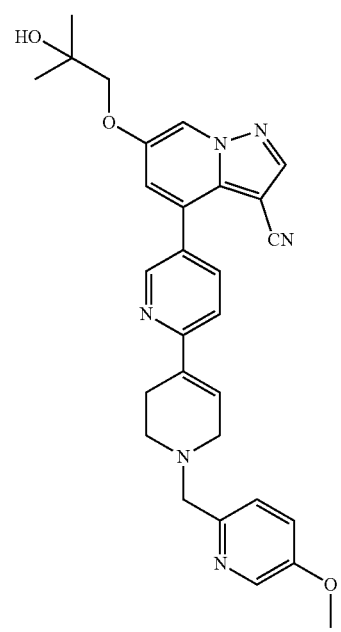

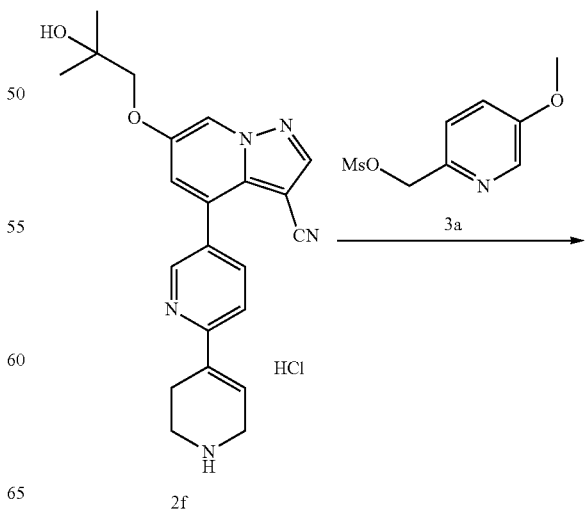

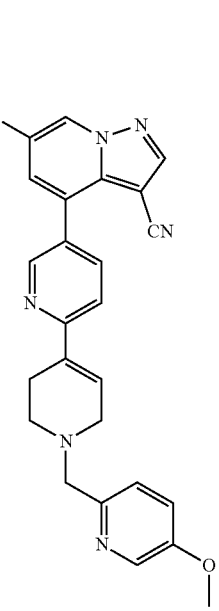

3

Step 1

6-(2-hydroxy-2-methylpropoxy)-4-(1'-((5-methoxy-pyridin-2-yl)methyl)-1',2',3',6'-tetrahydro-[2,4'-bi-pyridin]-5-yl)pyrazolo[1,5-a]pyridine-3-carbonitrile
3

6-(2-hydroxy-2-methylpropoxy)-4-(1',2',3',6'-tetrahydro-[2,4'-bipyridin]-5-yl)pyrazolo[1,5-a]pyridine-3-carbonitrile hydrogen chloride 2f (78 mg, 0.175 mmol) was added to a 10 mL three-necked flask, then 3 mL of acetonitrile, TEA (202 mg, 2 mmol), and (5-methoxypyridin-2-yl)methyl methanesulfonate 3a (176 mg, 0.8 mmol, prepared by the method disclosed in the patent application "WO2018130838") were added successively, and a resulting reaction solution was heated to 70° C. and reacted for 2 h. The reaction solution was cooled to room temperature, 100 ml of water was added, and a resulting mixture was stirred and filtered. A resulting filter cake was collected and subjected to purification by high-performance liquid chromatography (HPLC) to obtain 6-(2-hydroxy-2-methyl-propoxy)-4-(1'-((5-methoxypyridin-2-yl)methyl)-1',2',3',6'-tetrahydro-[2,4'-bipyridin]-5-yl)pyrazolo[1,5-a]pyridine-3-carbonitrile 3 (36 mg, yellow solid), with a yield of 36%.

MS m/z (ESI): 511.3 [M+1]

$^1$H NMR (400 MHZ, DMSO): δ 8.80 (dd, J=9.5, 2.2 Hz, 2H), 8.61 (s, 1H), 8.42 (d, J=2.3 Hz, 1H), 8.09 (dt, J=8.8, 4.4 Hz, 1H), 7.80 (d, J=8.2 Hz, 1H), 7.57 (dt, J=8.6, 5.5 Hz, 2H), 7.50-7.43 (m, 1H), 6.85 (s, 1H), 4.54 (s, 2H), 4.00 (s, 2H), 3.90 (d, J=2.3 Hz, 2H), 3.89 (s, 3H), 3.54 (s, 2H), 2.95 (s, 2H), 1.23 (s, 6H).

Example 4

6-(2-hydroxy-2-methylpropoxy)-4-(1'-(4-methoxy-benzyl)-1',2',3',6'-tetrahydro-[2,4'-bipyridin]-5-yl)pyrazolo[1,5-a]pyridine-3-carbonitrile

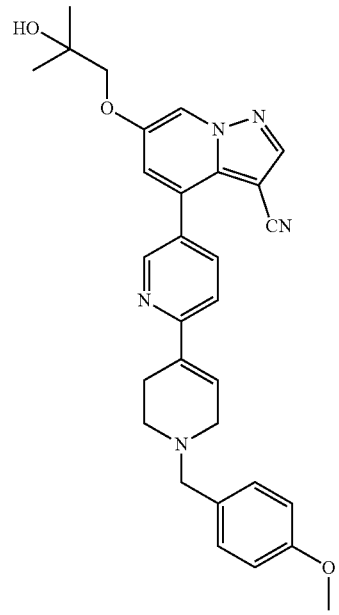

4

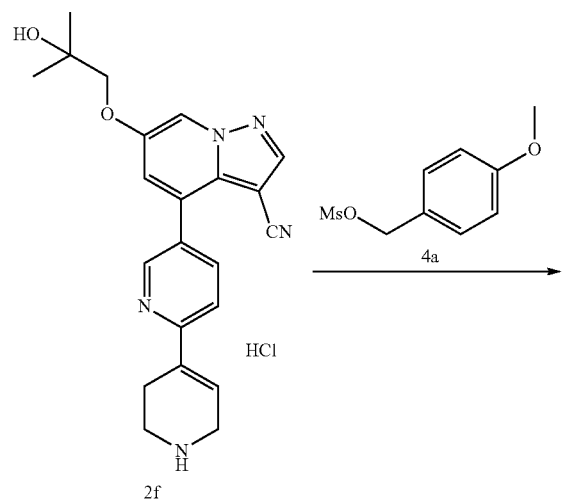

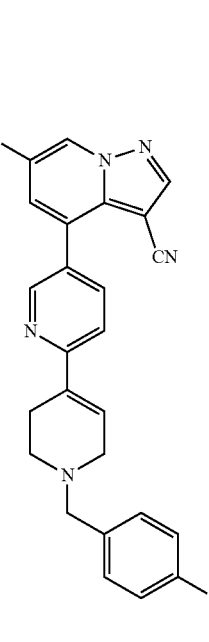

4

Step 1

6-(2-hydroxy-2-methylpropoxy)-4-(1'-(4-methoxy-benzyl)-1',2',3',6'-tetrahydro-[2,4'-bipyridin]-5-yl) pyrazolo[1,5-a]pyridine-3-carbonitrile 4

6-(2-hydroxy-2-methylpropoxy)-4-(1',2',3',6'-tetrahydro-[2,4'-bipyridin]-5-yl)pyrazolo[1,5-a]pyridine-3-carbonitrile hydrogen chloride 2f (78 mg, 0.175 mmol) was added to a 10 mL three-necked flask, then 3 mL of acetonitrile, TEA (121 mg, 1.2 mmol), and 4-methoxybenzyl methanesulfonate 4a (250 mg, 1 mmol, prepared by the method disclosed in the patent application "U.S. Pat. No. 6,194,406") were added successively, and a resulting reaction solution was heated to 70° C. and reacted for 3 h. The reaction solution was cooled to room temperature, and 20 mL of water was added. Extraction was conducted with a mixture of DCM and methanol (V:V=10:1, 15 mL×3), a resulting organic phase was concentrated under reduced pressure, and a residue was purified by HPLC to obtain 6-(2-hydroxy-2-methylpropoxy)-4-(1'-(4-methoxybenzyl)-1',2',3',6'-tetrahydro-[2,4'-bipyridin]-5-yl)pyrazolo[1,5-a]pyridine-3-carbonitrile 4 (10 mg, yellow solid), with a yield of 10%.

MS m/z (ESI): 510.3 [M+1]

$^1$H NMR (400 MHZ, DMSO): δ 12.24-12.18 (m, 1H), 8.77 (dd, J=8.2, 2.1 Hz, 2H), 8.65 (s, 1H), 8.08 (d, J=2.0 Hz, 1H), 8.0 (dt, J=15.9, 7.9 Hz, 1H), 7.78-7.62 (m, 4H), 7.44-7.21 (m, 3H), 6.83 (t, J=5.7 Hz, 2H), 4.71 (s, 1H), 3.89 (s, 2H), 3.84 (s, 3H), 3.58 (s, 2H), 3.14 (d, J=2.4 Hz, 2H), 2.77 (d, J=4.9 Hz, 2H), 2.69 (s, 2H), 1.25 (s, 6H).

Example 5

4-(1'-((5-fluoropyridin-3-yl)methyl)-1',2',3',6'-tetrahydro-[2,4'-bipyridin]-5-yl)-6-(2-hydroxy-2-methyl-propoxy) pyrazolo[1,5-a]pyridine-3-carbonitrile 5

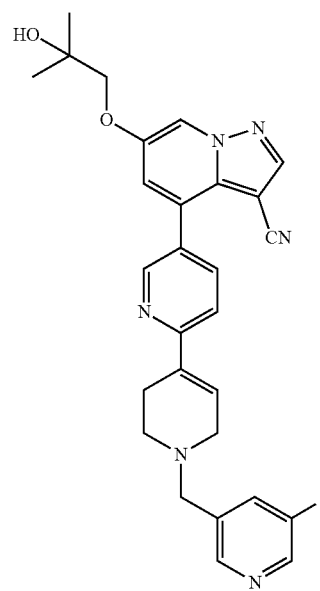

5

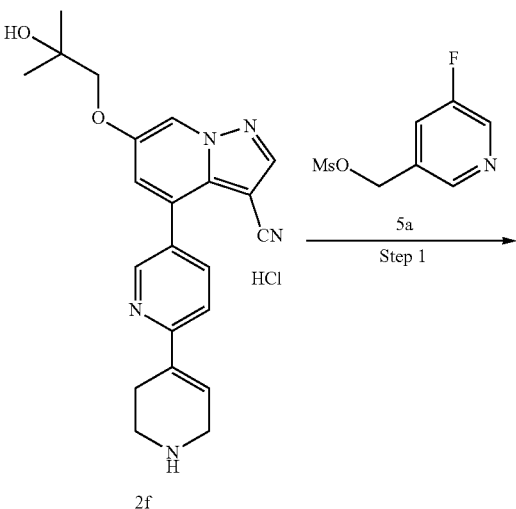

45

-continued

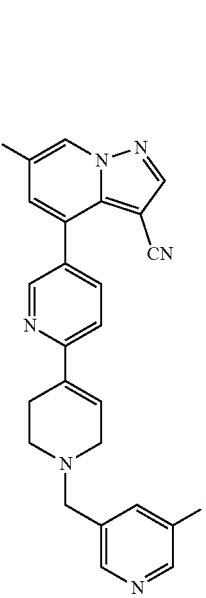

5

Step 1

4-(1'-((5-fluoropyridin-3-yl)methyl)-1',2',3',6'-tetrahydro-[2,4'-bipyridin]-5-yl)-6-(2-hydroxy-2-methylpropoxy) pyrazolo[1,5-a]pyridine-3-carbonitrile 5

(5-fluoropyridin-3-yl)methyl methanesulfonate 5a (150 mg, 0.73 mmol, prepared by the method disclosed in the patent application "US20080153883") was dissolved in 5 mL of acetonitrile, then 6-(2-hydroxy-2-methylpropoxy)-4-(1',2',3',6'-tetrahydro-[2,4'-bipyridin]-5-yl)pyrazolo[1,5-a]pyridine-3-carbonitrile hydrogen chloride 2f (95 mg, 0.24 mmol) and TEA (73 mg, 0.72 mmol) were added, and a resulting reaction solution was heated to 70° C. and reacted for 2 h. After a TLC test showed that the reaction was completed, 5 mL of water was added for quenching. Extraction was conducted with ethyl acetate (5 mL×3), a resulting organic phase was washed with a saturated sodium chloride solution (5 mL), dried over anhydrous sodium sulfate, filtered, and concentrated under reduced pressure, and a residue was purified by HPLC to obtain 4-(1'-((5-fluoropyridin-3-yl)methyl)-1',2',3',6'-tetrahydro-[2,4'-bipyridin]-5-yl)-6-(2-hydroxy-2-methylpropoxy) pyrazolo[1,5-a]pyridine-3-carbonitrile 5 (10 mg, red solid), with a yield of 2.7%.

MS m/z (ESI): 498.8 [M+1]

$^1$H NMR (400 MHZ, DMSO): δ 8.81 (d, J=2.0 Hz, 1H), 8.78 (d, J=2.0 Hz, 1H), 8.73 (d, J=2.8 Hz, 1H), 8.66 (s, 1H), 8.61 (s, 1H), 8.10 (dd, J=2.4, 8.0 Hz, 1H), 7.99 (ddd, J=2.4, 1.6, 9.6 Hz, 1H), 7.81 (d, J=8.4 Hz, 1H), 7.46 (d, J=2.4 Hz, 1H), 6.85 (s, 1H), 4.58 (s, 2H), 3.98 (s, 2H), 3.90 (s, 2H), 3.73 (s, 1H), 3.30 (s, 1H), 3.00 (t, 2H), 1.23 (s, 6H).

46

Example 6

6-(2-hydroxy-2-methylpropoxy)-4-(1'-(2-(phenyl-thio)ethyl)-1',2',3',6'-tetrahydro-[2,4'-bipyridin]-5-yl) pyrazolo[1,5-a]pyridine-3-carbonitrile 6

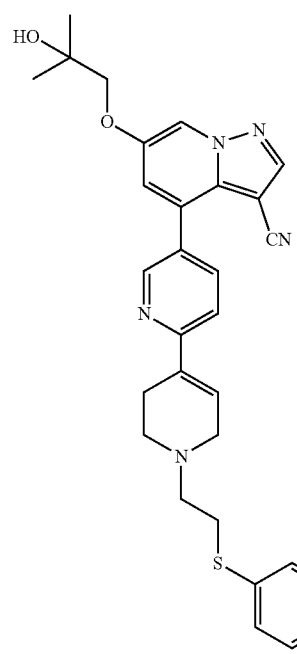

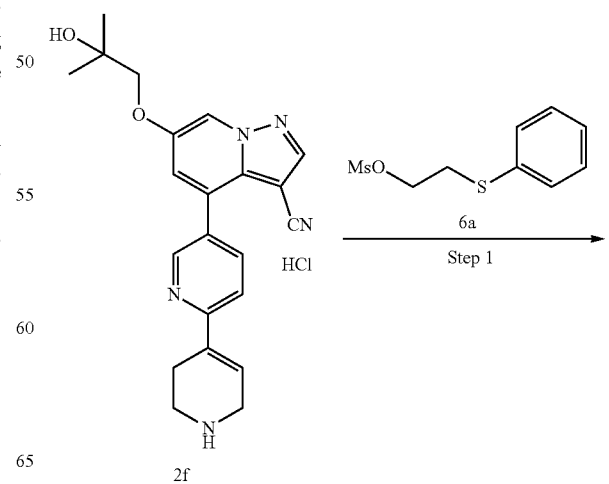

47

-continued

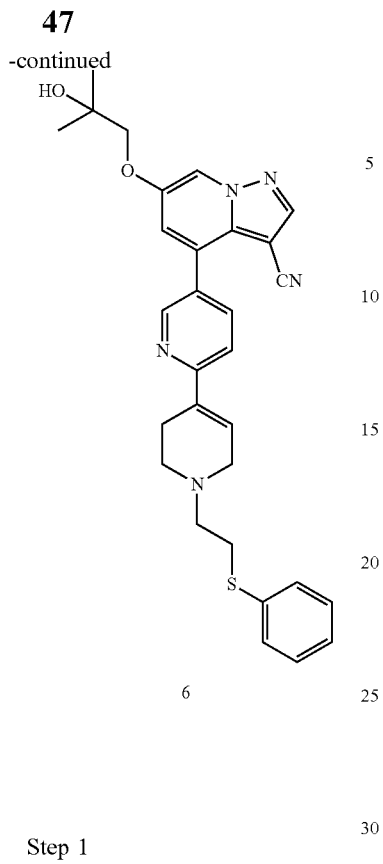

6

Step 1

6-(2-hydroxy-2-methylpropoxy)-4-(1'-(2-(phenyl-thio)ethyl)-1',2',3',6'-tetrahydro-[2,4'-bipyridin]-5-yl) pyrazolo[1,5-a]pyridine-3-carbonitrile 6

6-(2-hydroxy-2-methylpropoxy)-4-(1',2',3',6'-tetrahydro-[2,4'-bipyridin]-5-yl)pyrazolo[1,5-a]pyridine-3-carbonitrile hydrogen chloride 2f (78 mg, 0.175 mmol) was added to a 10 mL three-necked flask, then 3 mL of acetonitrile, TEA (121 mg, 1.2 mmol), and 2-(phenylthio)ethyl methane-sulfonate 6a (93 mg, 0.4 mmol, prepared by the method disclosed in the patent application "JP2017137276") were added successively, and a resulting reaction solution was heated to 70° C. and reacted for 5 h. The reaction solution was cooled to room temperature, 20 mL of water was added, and a resulting mixture was stirred and filtered. A resulting filter cake was subjected to purification by HPLC to obtain 6-(2-hydroxy-2-methylpropoxy)-4-(1'-(2-(phenylthio) ethyl)-1',2',3',6'-tetrahydro-[2,4'-bipyridin]-5-yl)pyrazolo[1, 5-a]pyridine-3-carbonitrile 6 (30 mg, white solid), with a yield of 30%.

MS m/z (ESI): 526.3 [M+1]

$^1$H NMR (400 MHZ, DMSO): δ 8.75 (dd, J=6.4, 2.0 Hz, 2H), 8.60 (s, 1H), 8.01 (dd, J=8.2, 2.3 Hz, 1H), 7.70 (d, J=8.3 Hz, 1H), 7.45 (d, J=2.0 Hz, 1H), 7.34 (dt, J=15.3, 7.6 Hz, 4H), 7.19 (t, J=7.0 Hz, 1H), 6.83 (s, 1H), 4.71 (s, 1H), 3.90 (s, 2H), 3.25 (s, 2H), 3.22-3.15 (m, 2H), 2.70 (d, J=6.5 Hz, 4H), 2.62 (s, 2H), 1.23 (s, 6H).

48

Example 7

4-(1'-(3,5-difluorobenzyl)-1',2',3',6'-tetrahydro-[2,4'-bipyridin]-5-yl)-6-(2-hydroxy-2-methylpropoxy) pyrazolo[1,5-a]pyridine-3-carbonitrile 7

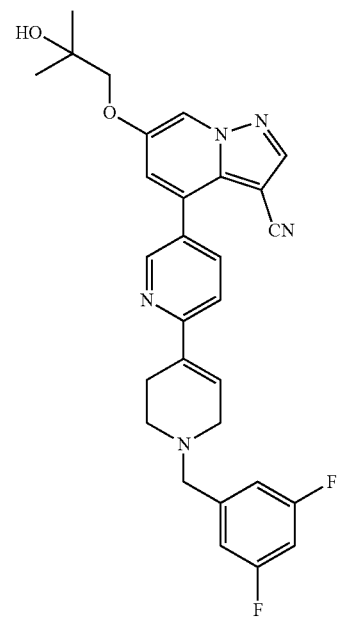

7

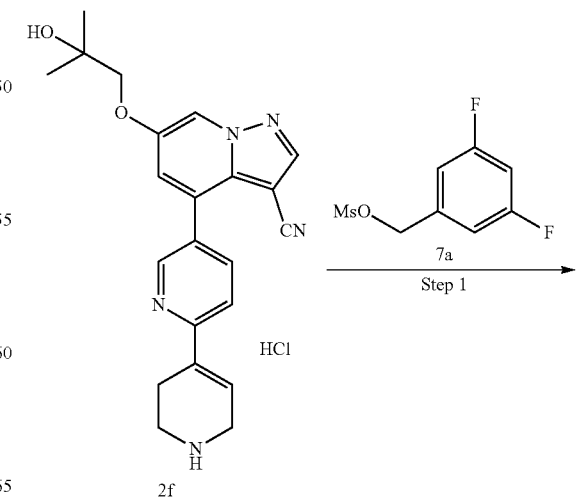

Step 1

Example 8

6-(2-hydroxy-2-methylpropoxy)-4-(1'-(6-methoxynicotinoyl)-1',2',3',6'-tetrahydro-[2,4'-bipyridin]-5-yl)pyrazolo[1,5-a]pyridine-3-carbonitrile 8

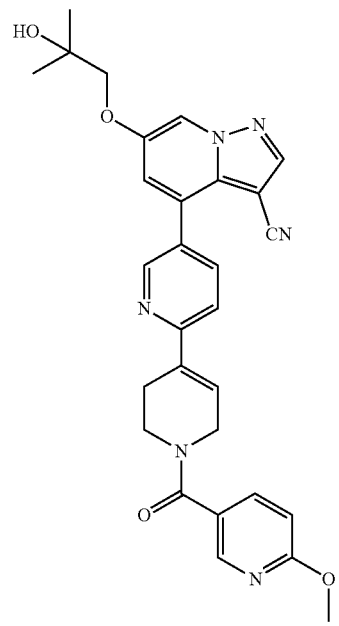

8

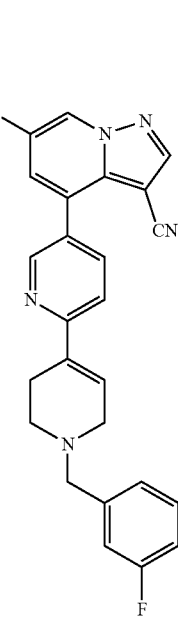

7

Step 1

4-(1'-(3,5-difluorobenzyl)-1',2',3',6'-tetrahydro-[2,4'-bipyridin]-5-yl)-6-(2-hydroxy-2-methylpropoxy)pyrazolo[1,5-a]pyridine-3-carbonitrile 7

6-(2-hydroxy-2-methylpropoxy)-4-(1',2',3',6'-tetrahydro-[2,4'-bipyridin]-5-yl)pyrazolo[1,5-a]pyridine-3-carbonitrile hydrogen chloride 2f (78 mg, 0.175 mmol) was added to a 10 mL three-necked flask, then 3 mL of acetonitrile, TEA (121 mg, 1.2 mmol), and 3,5-difluorobenzyl methanesulfonate 7a (88 mg, 0.4 mmol, prepared by the method disclosed in the patent application "WO2012092442") were added successively, and a resulting reaction solution was heated to 70° C. and reacted for 5 h. The reaction solution was cooled to room temperature, 20 mL of water was added, and a resulting mixture was stirred and filtered. A resulting filter cake was subjected to purification by HPLC to obtain 4-(1'-(3,5-difluorobenzyl)-1',2',3',6'-tetrahydro-[2,4'-bipyridin]-5-yl)-6-(2-hydroxy-2-methylpropoxy) pyrazolo[1,5-a]pyridine-3-carbonitrile 7 (50 mg, white solid), with a yield of 50%.

MS m/z (ESI): 516.3 [M+1]

$^1$H NMR (400 MHz, DMSO): δ 8.80 (dd, J=10.8, 2.1 Hz, 2H), 8.61 (s, 1H), 8.10 (dd, J=8.3, 2.3 Hz, 1H), 7.81 (d, J=8.2 Hz, 1H), 7.47 (d, J=2.1 Hz, 1H), 7.46-7.39 (m, 1H), 7.37 (d, J=6.1 Hz, 2H), 6.84 (s, 1H), 4.50 (s, 2H), 3.95 (s, 2H), 3.90 (s, 2H), 3.57 (dd, J=122.6, 40.4 Hz, 2H), 2.95 (d, J=49.9 Hz, 2H), 1.23 (s, 6H)

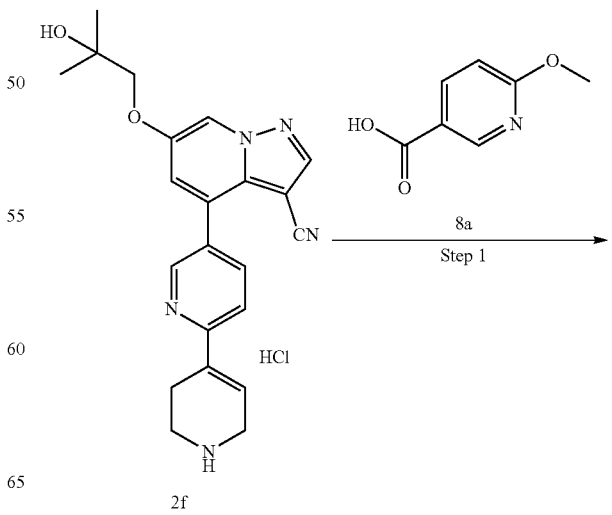

2f

-continued

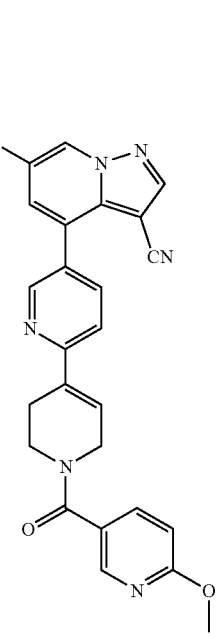

8

Step 1

6-(2-hydroxy-2-methylpropoxy)-4-(1'-(6-methoxynicotinoyl)-1',2',3',6'-tetrahydro-[2,4'-bipyridin]-5-yl)pyrazolo[1,5-a]pyridine-3-carbonitrile 8

6-(2-hydroxy-2-methylpropoxy)-4-(1',2',3',6'-tetrahydro-[2,4'-bipyridin]-5-yl)pyrazolo[1,5-a]pyridine-3-carbonitrile hydrogen chloride 2f (39 mg, 0.087 mmol) was added to a 10 mL three-necked flask, then 2 mL of DMF, 6-methoxynicotinic acid 8a (30 mg, 0.196 mmol), 2-(7-ozobenzotriazole)-N,N,N',N'-tetramethyluronium hexafluorophosphate (38 mg, 0.1 mmol), and DIPEA (64.5 mg, 0.5 mmol) were added successively, and a resulting reaction solution was stirred at room temperature for 16 h. 30 mL of water was added, a resulting mixture was stirred and filtered, and a resulting filter cake was subjected to purification by HPLC to obtain 6-(2-hydroxy-2-methylpropoxy)-4-(1'-(6-methoxynicotinoyl)-1',2',3',6'-tetrahydro-[2,4'-bipyridin]-5-yl)pyrazolo[1,5-a]pyridine-3-carbonitrile 8 (21 mg, white solid), with a yield of 40%.

MS m/z (ESI): 522.2 [M+1]

$^1$H NMR (400 MHZ, DMSO): δ 8.80-8.75 (m, 2H), 8.61 (s, 1H), 8.35 (d, J=2.0 Hz, 1H), 8.06 (dd, J=8.3, 2.3 Hz, 1H), 7.85 (dd, J=8.5, 2.4 Hz, 1H), 7.74 (d, J=8.1 Hz, 1H), 7.46 (d, J=2.0 Hz, 1H), 6.92 (s, 1H), 6.90 (s, 1H), 4.32 (s, 2H), 3.91 (s, 3H), 3.90 (s, 2H), 3.69 (d, J=28.5 Hz, 2H), 2.74 (s, 2H), 1.23 (s, 6H).

Example 9

(R)-6-(2-hydroxy-2-methylpropoxy)-4-(1'-(2-phenylpropanoyl)-1',2',3',6'-tetrahydro-[2,4'-bipyridin]-5-yl)pyrazolo[1,5-a]pyridine-3-carbonitrile 9

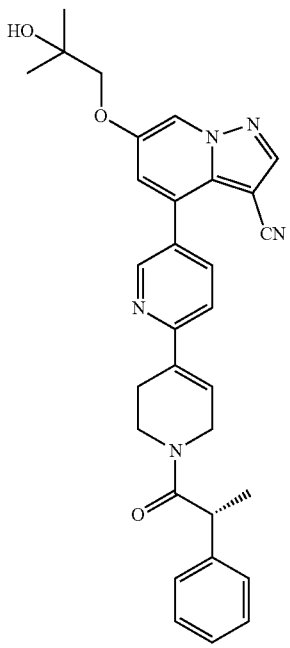

9

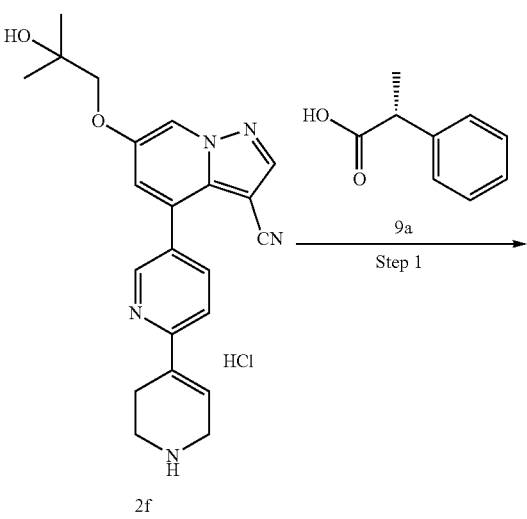

Example 10

6-(3-hydroxy-3-methylbutyl)-4-(6-(6-(((6-methoxy-pyridin-3-yl)methyl)-3,6-diazabicyclo[3.1.1]heptan-3-yl) pyridin-3-yl)pyrazolo[1,5-a]pyridine-3-carbonitrile 10

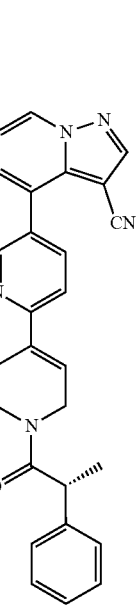

9

Step 1

(R)-6-(2-hydroxy-2-methylpropoxy)-4-(1'-(2-phenylpropanoyl)-1',2',3',6'-tetrahydro-[2,4'-bipyridin]-5-yl)pyrazolo[1,5-a]pyridine-3-carbonitrile 9

6-(2-hydroxy-2-methylpropoxy)-4-(1',2',3',6'-tetrahydro-[2,4'-bipyridin]-5-yl)pyrazolo[1,5-a]pyridine-3-carbonitrile hydrogen chloride 2f (39 mg, 0.087 mmol) was added to a 10 mL three-necked flask, then 2 mL of DMF, (R)-2-phenylpropionic acid 9a (30 mg, 0.2 mmol), 2-(7-ozobenzotriazole)-N,N,N',N'-tetramethyluronium hexafluorophosphate (38 mg, 0.1 mmol), and DIPEA (64.5 mg, 0.5 mmol) were added successively, and a resulting reaction solution was stirred at room temperature for 16 h. 30 mL of water was added, a resulting mixture was stirred and filtered, and a resulting filter cake was subjected to purification by HPLC to obtain 6 (R)-6-(2-hydroxy-2-methylpropoxy)-4-(1'-(2-phenylpropanoyl)-1',2',3',6'-tetrahydro-[2,4'-bipyridin]-5-yl)pyrazolo[1,5-a]pyridine-3-carbonitrile 9 (21 mg, white solid), with a yield of 40%.

MS m/z (ESI): 522.2 [M+1]

$^1$H NMR (400 MHz, DMSO): δ 8.81-8.69 (m, 2H), 8.61 (d, J=13.6 Hz, 1H), 8.03-7.98 (m, 1H), 7.66 (t, J=9.4 Hz, 1H), 7.43 (d, J=1.8 Hz, 1H), 7.32 (t, J=7.0 Hz, 4H), 7.23 (t, J=6.6 Hz, 1H), 6.77 (d, J=43.6 Hz, 1H), 4.37 (dd, J=43.8, 17.1 Hz, 3H), 4.25-4.11 (m, 2H), 3.89 (s, 2H), 3.70-3.57 (m, 2H), 2.00 (dd, J=15.0, 7.3 Hz, 1H), 1.33 (d, J=6.7 Hz, 3H), 1.23 (s, 6H).

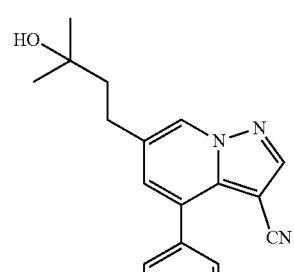

10

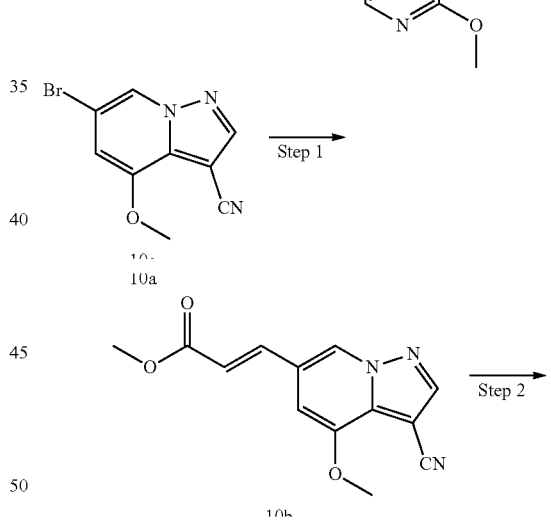

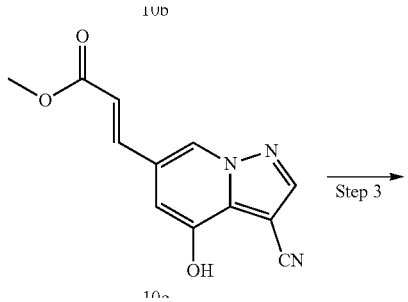

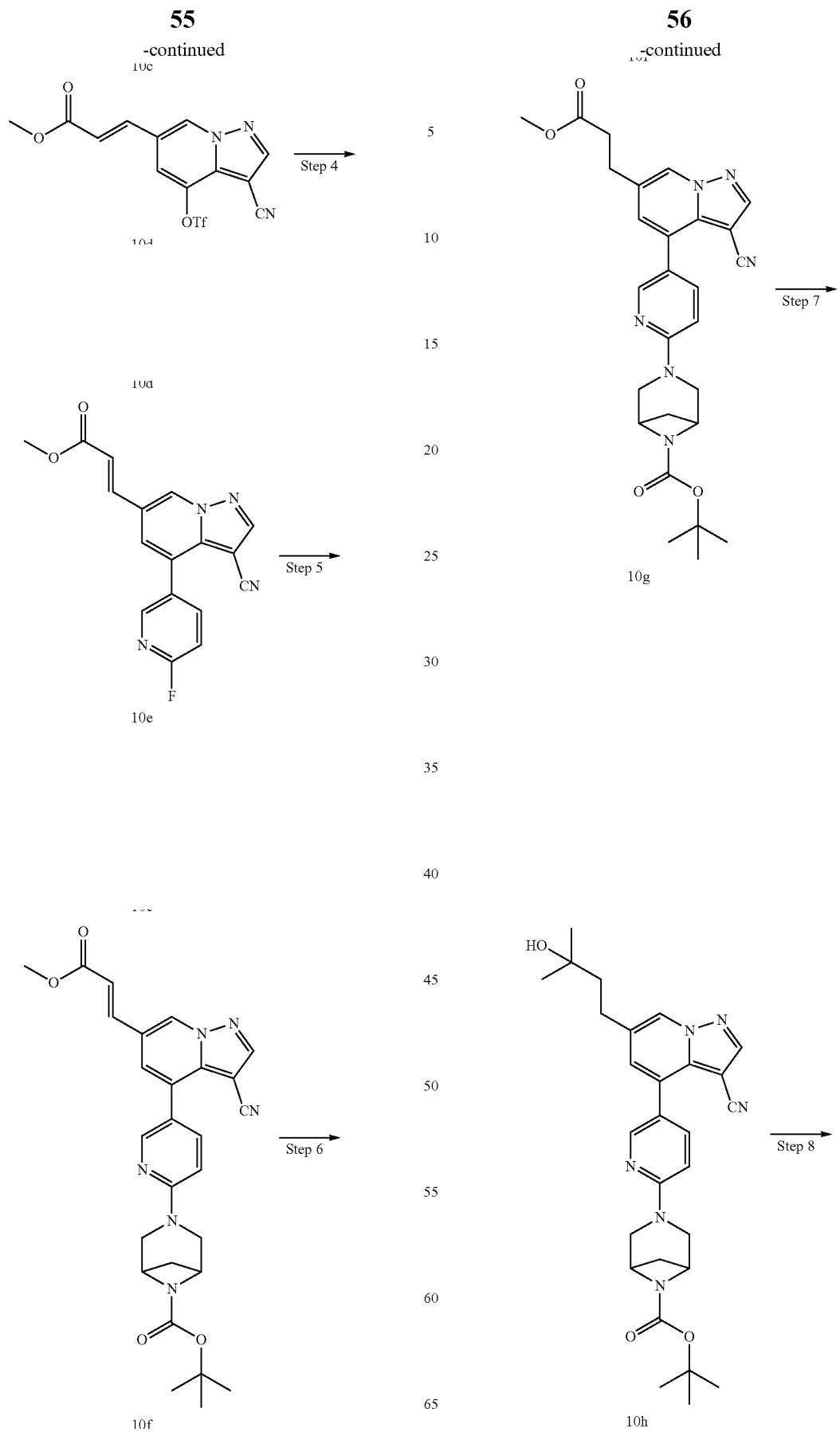

-continued

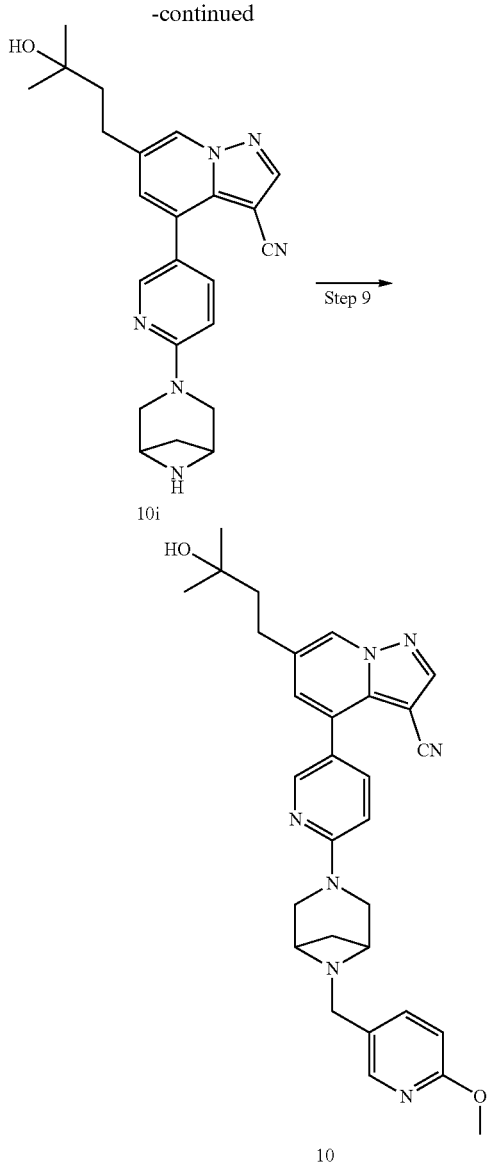

Step 1

Methyl(E)-3-(3-cyano-4-methoxypyrazolo[1,5-a]pyridin-6-yl) acrylate 10b

6-Bromo-4-methoxypyrazolo[1,5-a]pyridin-3-carbonitrile 10a (2.52 g, 10 mmol, prepared by the method disclosed in the patent application "WO2017011776"), methyl acrylate (3.2 mL, 35 mmol), TEA (3.75 mL, 27 mmol), tris(2-methylphenyl)phosphine (0.51 g, 1.67 mmol), and palladium acetate (0.25 g, 1.13 mmol) were added to 15 mL of acetonitrile, and under the protection of nitrogen, a resulting reaction solution was heated to reflux and reacted under reflux for 16 h. The reaction solution was concentrated under reduced pressure, and a residue was purified by silica gel column chromatography (eluent: system C) to obtain methyl (E)-3-(3-cyano-4-methoxypyrazolo[1,5-a]pyridin-6-yl) acrylate 10b (1.8 g, light-yellow solid), with a yield of 70%.

MS m/z (ESI): 258.1 [M+1]

$^1$H NMR (400 MHZ, DMSO): δ 8.99 (s, 1H), 8.65 (s, 1H), 7.75 (dd, J=16.0, 9.9 Hz, 1H), 7.45 (s, 1H), 6.96 (d, J=16.0 Hz, 1H), 4.07 (s, 3H), 3.76 (s, 3H).

Step 2

Methyl(E)-3-(3-cyano-4-hydroxypyrazolo[1,5-a]pyridin-6-yl) acrylate 10c

Methyl(E)-3-(3-cyano-4-methoxypyrazolo[1,5-a]pyridin-6-yl) acrylate 10b (1.54 g, 6.0 mmol) was added to 80 mL of 1,2-dichloroethane (DCE), then aluminum trichloride (2.4 g, 18 mmol) was added, and a resulting reaction solution was heated to 80° C. and reacted for 4 h. The reaction solution was cooled to room temperature, then tetrahydrofuran (THF) (100 mL) and sodium sulfate decahydrate (10 g) were added for quenching, a resulting mixture was stirred overnight at room temperature and then filtered, and a resulting filtrate was concentrated under reduced pressure to obtain methyl(E)-3-(3-cyano-4-hydroxypyrazolo[1,5-a]pyridin-6-yl) acrylate 10c (1.22 g, black-brown solid), which would be directly used in the next step.

MS m/z (ESI): 244 [M+1]

Step 3

Methyl(E)-3-(3-cyano-4-(((trifluoromethyl) sulfonyl)oxy) pyrazolo[1,5-a]pyridin-6-yl) acrylate 10d Methyl(E)-3-(3-cyano-4-hydroxypyrazolo[1,5-a]pyridin-6-yl) acrylate 10c (1.22 g, 5.0 mmol) was added to 10 mL of N,N-dimethylacetamide (DMAc), then N-phenylbis(trifluoromethanesulfonimide) (3.57 g, 10.0 mmol), and DIPEA (1.7 mL, 5.0 mmol) were added, and a resulting reaction solution was stirred at room temperature for 2 h. Ethyl acetate (200 mL) was added to the reaction solution, a resulting organic phase was washed successively with water (50 mL×3) and a saturated sodium chloride solution (50 mL), dried over anhydrous sodium sulfate, filtered, and concentrated under reduced pressure, and a residue was purified by silica gel column chromatography (eluent: system C) to obtain methyl(E)-3-(3-cyano-4-(((trifluoromethyl) sulfonyl)oxy) pyrazolo[1,5-a]pyridin-6-yl) acrylate 10d (0.76 g, light-yellow solid), with a yield of 40.4%.

MS m/z (ESI): 376 [M+1]

$^1$H NMR (400 MHZ, DMSO): δ 9.56 (s, 1H), 8.88 (s, 1H), 8.43 (s, 1H), 7.81 (d, J=16.1 Hz, 1H), 7.01 (d, J=16.0 Hz, 1H), 3.77 (s, 3H).

Step 4

Methyl(E)-3-(3-cyano-4-(6-fluoropyridin-3-yl)pyrazolo[1,5-a]pyridin-6-yl) acrylate 10e Methyl(E)-3-(3-cyano-4-(((trifluoromethyl) sulfonyl)oxy) pyrazolo[1,5-a]pyridin-6-yl) acrylate 10d (751 mg, 2.0 mmol), 2-fluoropyridine-5-boronic acid pinacol ester (670 mg, 3.0 mmol), tetrakis(triphenylphosphine) palladium (116 mg, 0.1 mmol), 3 mL of a 2 N sodium carbonate solution, and 9 mL of 1,2-DCE were added to a 25 mL microwave tube, and under the protection of nitrogen, a resulting reaction solution was heated to 100° C. and subjected to a microwave reaction for 1.5 h. The reaction solution was filtered, and a resulting filter cake was washed with water (2 mL×5) and dried to obtain methyl(E)-3-(3-cyano-4-(6-fluoropyridin-3-yl)pyrazolo[1,5-a]pyridin-6-yl) acrylate 10e (560 mg, light-yellow solid), which would be directly used in the next step.

MS m/z (ESI): 323 [M+1]

$^1$H NMR (400 MHZ, DMSO): δ 9.46 (s, 1H), 8.78 (s, 1H), 8.29 (d, J=5.2 Hz, 1H), 8.15 (s, 1H), 7.83 (d, J=16.2 Hz, 1H), 7.49-7.37 (m, 2H), 6.98 (d, J=16.0 Hz, 1H), 3.75 (s, 3H).

Step 5

Tert-butyl(E)-3-(5-(3-cyano-6-(3-methoxy-3-oxo-prop-1-en-1-yl)pyrazolo[1,5-a]pyridin-4-yl) pyridin-2-yl)-3,6-diazabicyclo[3.1.1]heptane-6-carboxylate 10f Methyl(E)-3-(3-cyano-4-(6-fluoropyridin-3-yl)pyrazolo[1,5-a]pyridin-6-yl) acrylate 10e (500 mg, 1.55 mmol) was added to 3 mL of DMSO, tert-butyl 3,6-diazabicyclo[3.1.1]heptane-6-carboxylate (309 mg, 1.55 mmol), and potassium carbonate (1.1 g, 7.75 mmol) were added, and a resulting reaction solution was heated to 90° C. and reacted for 20 h. Ethyl acetate (100 mL) was added to the reaction solution, a resulting organic phase was washed successively with water (30 mL×3) and a saturated sodium chloride solution (30 mL), dried over anhydrous sodium sulfate, filtered, and concentrated under reduced pressure, and a residue was purified by silica gel column chromatography (eluent: system C) to obtain tert-butyl(E)-3-(5-(3-cyano-6-(3-methoxy-3-oxoprop-1-en-1-yl)pyrazolo[1,5-a]pyridin-4-yl) pyridin-2-yl)-3,6-diazabicyclo[3.1.1]heptane-6-carboxylate 10f (250 mg, light-yellow solid), with a yield of 32.3%.

MS m/z (ESI): 501 [M+1]

Step 6

Tert-butyl 3-(5-(3-cyano-6-(3-methoxy-3-oxopropyl)pyrazolo[1,5-a]pyridin-4-yl) pyridin-2-yl)-3,6-diazabicyclo[3.1.1]heptane-6-carboxylate 10g Tert-butyl(E)-3-(5-(3-cyano-6-(3-methoxy-3-oxoprop-1-en-1-yl)pyrazolo[1,5-a]pyridin-4-yl) pyridin-2-yl)-3,6-diazabicyclo[3.1.1]heptane-6-carboxylate 10f (180 mg, 0.36 mmol) was added to 5 mL of methanol, and a resulting reaction solution reacted at room temperature for 12 h in a hydrogen atmosphere. The reaction solution was filtered, and a resulting filtrate was concentrated under reduced pressure to obtain tert-butyl 3-(5-(3-cyano-6-(3-methoxy-3-oxopropyl)pyrazolo[1,5-a]pyridin-4-yl) pyridin-2-yl)-3,6-diazabicyclo[3.1.1]heptane-6-carboxylate 10g (171 mg, light-yellow solid), which would be directly used in the next step.

MS m/z (ESI): 503 [M+1]

Step 7

Tert-butyl 3-(5-(3-cyano-6-(3-hydroxy-3-methylbutyl)pyrazolo[1,5-a]pyridin-4-yl) pyridin-2-yl)-3,6-diazabicyclo[3.1.1]heptane-6-carboxylate 10h Tert-butyl 3-(5-(3-cyano-6-(3-methoxy-3-oxopropyl)pyrazolo[1,5-a]pyridin-4-yl) pyridin-2-yl)-3,6-diazabicyclo[3.1.1]heptane-6-carboxylate 10g (150 mg, 0.3 mmol) was added to 10 mL of anhydrous diethyl ether, then 3 N methyl magnesium bromide (1.0 mL) was added dropwise at 0° C., and a resulting reaction solution was warmed to room temperature and reacted for 2 h. Ethyl acetate (100 mL) was added to the reaction solution for dilution, and a saturated ammonium chloride solution (30 mL) was added for quenching. A resulting organic phase was washed with a saturated sodium chloride solution (30 mL), dried over anhydrous sodium sulfate, filtered, and concentrated under reduced pressure, and a residue was purified by silica gel column chromatography (eluent: system C) to obtain tert-butyl 3-(5-(3-cyano-6-(3-hydroxy-3-methylbutyl)pyrazolo[1,5-a]pyridin-4-yl) pyridin-2-yl)-3,6-diazabicyclo[3.1.1]heptane-6-carboxylate 10h (50 mg, light-yellow solid), with a yield of 33%.

MS m/z (ESI): 503 [M+1]

Step 8

4-(6-(3,6-diazabicyclo[3.1.1]heptan-3-yl) pyridin-3-yl)-6-(3-hydroxy-3-methylbutyl)pyrazolo[1,5-a]pyridine-3-carbonitrile 10i Tert-butyl 3-(5-(3-cyano-6-(3-hydroxy-3-methylbutyl)pyrazolo[1,5-a]pyridin-4-yl) pyridin-2-yl)-3,6-diazabicyclo[3.1.1]heptane-6-carboxylate 10h (50 mg, 0.1 mmol) was added to 1 mL of DCM, then a 4 N hydrochloric acid/dioxane solution (1 mL) was added, and a resulting reaction solution reacted at room temperature for 12 h. The reaction solution was concentrated under reduced pressure to obtain 4-(6-(3,6-diazabicyclo[3.1.1]heptan-3-yl) pyridin-3-yl)-6-(3-hydroxy-3-methylbutyl)pyrazolo[1,5-a]pyridine-3-carbonitrile 10i (40 mg, yellow oily product), which would be directly used in the next step.

MS m/z (ESI): 403 [M+1]

Step 9

6-(3-hydroxy-3-methylbutyl)-4-(6-(6-((6-methoxypyridin-3-yl)methyl)-3,6-diazabicyclo[3.1.1]heptan-3-yl) pyridin-3-yl)pyrazolo[1,5-a]pyridine-3-carbonitrile 10

4-(6-(3,6-diazabicyclo[3.1.1]heptan-3-yl) pyridin-3-yl)-6-(3-hydroxy-3-methylbutyl)pyrazolo[1,5-a]pyridine-3-carbonitrile 10i (40 mg, 0.1 mmol) was added to 2 mL of 1,2-DCE, then sodium triacetoxyborohydride (STAB) (27.4 mg, 0.2 mmol) and 6-methoxy-3-pyridinecarbaldehyde (63.6 mg, 0.3 mmol) were added, and a resulting reaction solution reacted at room temperature for 12 h. Ethyl acetate (100 mL) was added to the reaction solution for dilution, a resulting organic phase was washed with a saturated sodium chloride solution (30 mL), dried over anhydrous sodium sulfate, filtered, and concentrated under reduced pressure, and a residue was purified by silica gel column chromatography (eluent: system B) to obtain 6-(3-hydroxy-3-methylbutyl)-4-(6-(6-((6-methoxypyridin-3-yl)methyl)-3,6-diazabicyclo[3.1.1]heptan-3-yl) pyridin-3-yl)pyrazolo[1,5-a]pyridine-3-carbonitrile 10 (8 mg, light-yellow solid), with a yield of 15.4%.

MS m/z (ESI): 522 [M+1]

$^1$H NMR (400 MHZ, DMSO): δ 12.24-12.19 (m, 1H), 8.75 (dd, J=8.2, 2.1 Hz, 2H), 8.60 (s, 1H), 8.11 (d, J=2.0 Hz, 1H), 7.99 (dt, J=15.9, 7.9 Hz, 1H), 7.73-7.63 (m, 2H), 7.44 (d, J=2.0 Hz, 1H), 6.81 (t, J=5.7 Hz, 2H), 4.72 (s, 1H), 3.89 (s, 2H), 3.85 (s, 3H), 3.15 (d, J=2.4 Hz, 2H), 2.67 (d, J=4.9 Hz, 2H), 2.31-2.23 (m, 2H), 1.32 (s, 6H), 1.25-1.23 (m, 2H).

Biological Evaluation

Test Example 1 Determination of the Inhibitory Activity of the Compound of the Present Disclosure on the Proliferation of Tumor Cells with Abnormal RET (TT Cells)

The following method was used to determine the inhibitory activity of the preferred compound of the present disclosure on the proliferation of TT cells in vitro. TT cells were a human medullary thyroid cancer (MTC) cell line, including the RET C634W mutation. The cell line was purchased from the American ATCC (Cat. No. ATCC® CRL-1803). The cells were cultivated at 37° C. and 5% $CO_2$ with the Ham's F-12K (Kaighn's) medium (purchased from Thermofisher, Gibco, Cat. No. 21127022) that was supplemented with 10% fetal bovine serum (FBS, purchased from Thermofisher, Gibco, Cat. No. 12483-020), 1× Glutamax (purchased from Thermofisher, Gibco, Cat. No. 35050061), 1× non-essential amino acids (purchased from Thermofisher, Gibco, Cat. No. 11140050), and 1× Pen/Strep antibiotics (purchased from Thermofisher, Gibco, Cat. No. 15140122). Cell viability was determined using CellTiter-Glo® Luminescent Cell Viability Assay (Cat. No. G7573) of Promega.

Brief description of an experimental method: The day before the formal experiment, the cells at the logarithmic growth phase were digested with trypsin (purchased from Thermofisher, Gibco, Cat. No. 25300054), then an appropriate volume of the medium was added to terminate the trypsin reaction, and a resulting mixture was centrifuged at a speed of 1,000 rpm; a resulting supernatant was removed, and fresh medium was added to prepare a cell suspension; and 50 L of the cell suspension was added to a 96-well cell culture plate (purchased from Corning, Cat. No. 3904) with a cell density of 6,000 cells/well, and then the cell culture plate was incubated overnight at 37° C. and 5% $CO_2$. On the day of the experiment, a test compound was first dissolved in DMSO (Sigma-Aldrich, Cat. No. v900090) to prepare a stock solution, then the stock solution was serially diluted with DMSO at a ratio of 1:3 to obtain a total of 9 concentrations, and a DMSO control was set. Then another 96-well culture plate was taken, 250 uL of a serum-free F12 medium was added to each well, then 0.5 µL of a compound solution was added to a corresponding well, and a resulting mixture was thoroughly shaken to obtain a test sample. Then, 50 µL of a test sample solution was taken from each well and added to a cell plate, with a final test concentration range of 1.52 nM to 10,000 nM for the compound; and a duplicate well was set for each concentration. The cell plate was continuously incubated for 8 d at 37° C. and 5% $CO_2$. After the incubation was completed, 50 µL of a CellTiter-Glo reagent was added to each well, a resulting mixture was thoroughly shaken and then incubated at room temperature for 10 min in the dark, and then a signal of each well was read on the Envision microplate reader (Perkin Elmer). In the GraphPad Prism software, nonlinear regression analysis was conducted on the compound concentration logarithm-signal intensity to obtain an $IC_{50}$ value for inhibition of a test compound on cell proliferation.

The inhibitory activity of the compound of the present disclosure on the proliferation of tumor cells with abnormal RET (TT cells) was determined through the above experiment, and obtained $IC_{50}$ values were shown in Table 1.

Table 1 $IC_{50}$ for inhibition of the compound of the present disclosure on TT cell proliferation.

| Compound No. | $IC_{50}$ (nM) |
| --- | --- |
| 1 | 28.9 |
| 8 | 87.8 |
| 10 | 68.6 |

Conclusion: The compound of the present disclosure has a significant inhibitory effect on the proliferation of tumor cells with abnormal RET (TT cells)

Test Example 2 Determination of the Inhibitory Activity of the Compound of the Present Disclosure on RET Enzyme 1. Experimental Materials

| Reagent name | Manufacturer | Cat. No. |
| --- | --- | --- |
| GST-hRET kinase (658-1114) | Carna | 08-159 |
| HTRF KinEASE-TK kit | Cisbio | 62TK0PEC |
| 5 × enzyme reaction buffer | Cisbio | 62EZBFDC |
| TK substrate-biotin | Cisbio | 61TK0BLE |
| SEB | Cisbio | 61SEBALF |
| Ultra Pure ATP | Promega | V915A |
| TK Antibody-Cryptate | Cisbio | — |
| streptavidin-XL665 | Cisbio | 610SAXLA |
| Detection buffer | Cisbio | 62SDBRDD |
| 384-well plate | PerkinElmer | 6007290 |

2. Reagent Preparation
   (1) 1× enzyme reaction buffer: 5× enzyme reaction buffer was diluted with ultrapure water (UPW) at 4:1, and then 25 nM SEB was added.
   (2) 5×RET kinase: RET kinase was diluted with 1× enzyme reaction buffer to 2.5 nM.
   (3) 5×ATP: ATP was diluted with 1× enzyme reaction buffer to 50 µM.
   (4) 5× substrate: TK substrate-biotin was diluted with 1× enzyme reaction buffer to 2,500 nM.
   (5) 2.5× compound: The highest final concentration was 2,500 nm, 3-fold gradient dilution was conducted to obtain 10 dilution points, and a final DMSO concentration was 0.4%.
   (6) 4× Steptavidin-XL665: Steptavidin-XL665 was diluted with 1× enzyme reaction buffer to 250 µM.
3. Experimental Process
   (1) 5×RET kinase was added to a 384-well plate at 2 µl/well (final concentration of 0.5 nM), and a blank group (enzyme reaction buffer) was set as a negative control.
   (2) A 2.5× compound solution was added at 4 µl/well, and then the plate was incubated at room temperature for 30 min. A DMSO group was set as a positive control.
   (3) 5× substrate (at 2 µl/well, final concentration: 500 nM) and 5×ATP (at 2 µl/well, final concentration: 10 µM) were added to start a reaction, and the reaction was conducted at room temperature for 30 min.
   (4) TK Antibody-Cryptate (at 5 µl/well) and 4× Steptavidin-XL665 (at 5 µl/well, final concentration: 62.5 µM) were added, and the plate was incubated at room temperature for 60 min.
   (5) An HTRF signal was read on Envision.
4. Data Analysis The dosage effect ($IC_{50}$) of the compound with analyzed using the Graph Pad prism software.

Table 1 $IC_{50}$ for inhibition of the compound of the present disclosure on RET enzyme activity

| Compound No. | $IC_{50}$ (nM) |
| --- | --- |
| 1 | 23.1 |
| 2 | 25.4 |
| 10 | 5.6 |

Conclusion: The compound of the present disclosure has a significant inhibitory effect on RET enzyme activity.

What is claimed is:

1. A compound, represented by general formula (I):

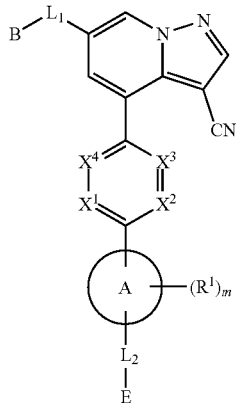

(I)

wherein the ring A is

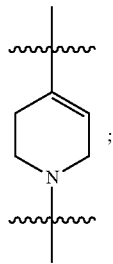

;

$X^1$ and $X^2$ are each independently selected from the group consisting of CH, CCH$_3$, CF, CCl, and N;
$X^3$ and $X^4$ are each independently selected from the group consisting of CH, CF, and N;
0, 1, or 2 of $X^1$, $X^2$, $X^3$, and $X^4$ is/are N;
$L_1$ is selected from the group consisting of a bond, —($R^aR^bC$)—, —($R^aR^bN$)—, and —O—;
$L_2$ is selected from the group consisting of a bond, -(alkylene)-, —C(O)—, —S(O)—, —SO$_2$—, -(alkylene)-O—, -(alkylene)-S—, -(alkylene)-NR$^1$—, —C(O)-(alkylene)-, and —SO$_2$-(alkylene)-, and the alkylene is optionally substituted by one or more substituents selected from the group consisting of hydroxyl, halogen, alkyl, alkoxy, cycloalkyl, heterocyclyl, aryl, heteroaryl, —NR$^2$R$^3$, —C(O)NR$^2$R$^3$, —C(O)R$^4$, —OC(O)R$^4$, —NR$^2$C(O)R$^3$, and —SO$_2$NR$^2$R$^3$;
$R^a$ is selected from the group consisting of hydrogen, alkyl, and halogen;
$R^b$ is selected from the group consisting of hydrogen, alkyl, and halogen;
or, $R^a$ and $R^b$, together with C or N atoms attached thereto, form 3-6 membered cycloalkyl or heterocyclyl, wherein the heterocyclyl comprises one or more N, O, and S(O)$_n$ atoms, and the cycloalkyl or the heterocyclyl is optionally substituted by one or more substituents selected from the group consisting of hydroxyl, halogen, alkyl, alkoxy, cycloalkyl, heterocyclyl, aryl, heteroaryl, —NR$^2$R$^3$, —C(O)NR$^2$R$^3$, —C(O)R$^4$, —OC(O)R$^4$, —NR$^2$C(O)R$^3$, and —SO$_2$NR$^2$R$^3$;
B is selected from the group consisting of hydrogen, alkyl, alkenyl, alkynyl, cycloalkyl, heterocyclyl, aryl, and heteroaryl, wherein the alkyl, alkenyl, alkynyl, cycloalkyl, heterocyclyl, aryl, or heteroaryl is optionally substituted by one or more substituents selected from Re;
E is selected from the group consisting of hydrogen, alkoxy, cycloalkyl, heterocyclyl, aryl, and heteroaryl, wherein the cycloalkyl, heterocyclyl, aryl, or heteroaryl is optionally substituted by one or more substituents selected from the group consisting of hydroxyl, halogen, nitro, cyano, alkyl, alkoxy, cycloalkyl, heterocyclyl, aryl, heteroaryl, —NR$^2$R$^3$, —C(O)NR$^2$R$^3$, —C(O)R$^4$, —OC(O)R$^4$, —NR$^2$C(O)R$^3$, and —SO$_2$NR$^2$R$^3$;
$R^c$ is selected from the group consisting of hydroxyl, halogen, nitro, cyano, alkyl, alkoxy, cycloalkyl, heterocyclyl, aryl, heteroaryl, —NR$^2$R$^3$, —C(O)NR$^2$R$^3$, —C(O)R$^4$, —OC(O)R$^4$, —NR$^2$C(O)R$^3$, and —S(O)$_2$NR$^2$R$^3$, wherein the alkyl, alkoxy, cycloalkyl, heterocyclyl, aryl, or heteroaryl is optionally substituted by one or more substituents selected from the group consisting of hydroxyl, halogen, nitro, cyano, alkyl, alkoxy, cycloalkyl, heterocyclyl, aryl, heteroaryl, —NR$^5$R$^6$, —C(O)NR$^5$R$^6$, —C(O)R$^7$, —OC(O)R$^7$, —NR$^5$C(O)R$^6$, and —SO$_2$NR$^5$R$^6$,
$R^1$ groups are the same or different and are each independently selected from the group consisting of hydrogen, hydroxyl, alkyl, halogen, and alkoxy, wherein the alkyl or alkoxy is optionally substituted by one or more substituents selected from the group consisting of hydroxyl, halogen, and alkoxy;
$R^2$, $R^3$, and $R^4$ are each independently selected from the group consisting of hydrogen, hydroxyl, halogen, nitro, cyano, alkyl, alkoxy, cycloalkyl, heterocyclyl, aryl, and heteroaryl, wherein the alkyl, alkoxy, cycloalkyl, heterocyclyl, aryl, or heteroaryl is optionally substituted by one or more substituents selected from the group consisting of hydroxyl, halogen, nitro, cyano, alkyl, alkoxy, cycloalkyl, heterocyclyl, aryl, heteroaryl, —NR$^5$R$^6$, —C(O)NR$^5$R$^6$, —C(O)R$^7$, —OC(O)) R$^7$, —NR$^5$C(O)R$^6$, and —SO: NR$^5$R$^6$;
or, $R^2$ and $R^3$, together with N atoms attached thereto, form 4-8 membered heterocyclyl, wherein the 4-8 membered heterocyclyl comprises one or more N, O, S(O) n atoms, and the 4-8 membered heterocyclyl is optionally substituted by one or more substituents selected from the group consisting of hydroxyl, halogen, nitro, cyano, alkyl, alkoxy, cycloalkyl, heterocyclyl, aryl, heteroaryl, =O, —NR$^5$R$^6$, —C(O)NR$^5$R$^6$, —C(O)R$^7$, —OC(O)) R$^7$, —NR$^5$C(O)R$^6$, and —SO$_2$NR$^5$R$^6$;
$R^5$, Re and $R^7$ are each independently selected from the group consisting of hydrogen, alkyl, cycloalkyl, heterocyclyl, aryl, and heteroaryl, wherein the alkyl, cycloalkyl, heterocyclyl, aryl, or heteroaryl is optionally substituted by one or more substituents selected from the group consisting of hydroxyl, halogen, nitro, cyano, alkyl, alkoxy, cycloalkyl, heterocyclyl, aryl, heteroaryl, carboxyl, and carboxylate;

m is selected from the group consisting of 0, 1, 2, 3, 4, and 5;

n is selected from the group consisting of 0, 1, and 2.

2. The compound according to claim 1, which is a compound of general formula (II):

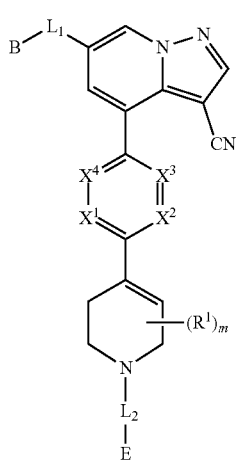

(II)

wherein $L_1$ is —O—;

$L_2$, B, E, $X^1$, $X^2$, $X^3$, $X^4$, $R^1$, $R^a$, $R^b$, and m are as defined in claim 1.

3. The compound according to claim 1, wherein $X^1$, $X^2$, $X^3$, and $X^4$ are each selected from the group consisting of CH and N;

0, 1, or 2 of $X^1$, $X^2$, $X^3$, and $X^4$ is/are N; and $X^1$ is N, and $X^2$, $X^3$, and $X^4$ are CH.

4. The compound according to claim 1, wherein $L_2$ is selected from the group consisting of a bond, -(alkylene)-, —C(O)—, —SO$_2$—, -(alkylene)-O—, -(alkylene)-S—, -(alkylene)-NR$^1$—, and —C(O)-(alkylene)-.

5. The compound according to claim 1, wherein B is selected from the group consisting of:

(i) 5-6 membered heteroaryl, wherein the heteroaryl is optionally substituted by one or more substituents selected from the group consisting of alkyl and halogen;

(ii) alkyl, wherein the alkyl is optionally substituted by one or more hydroxyl;

(iii) alkenyl or alkynyl, wherein the alkenyl or alkynyl is optionally substituted by one or more hydroxyl.

6. The compound according to claim 1, wherein the compound is selected from the group consisting of:

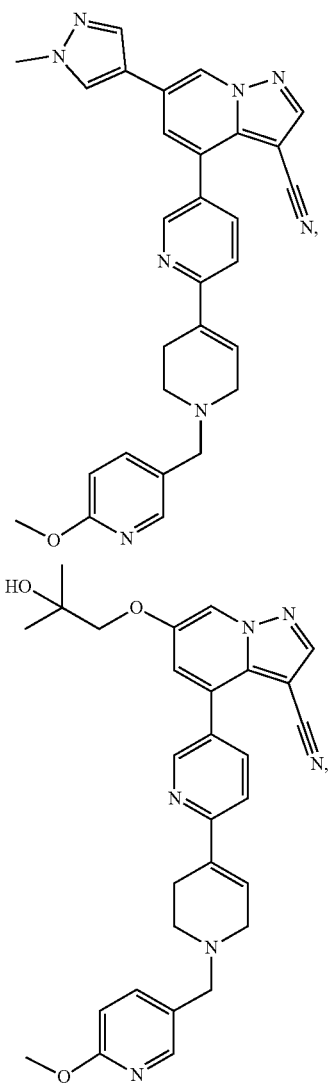

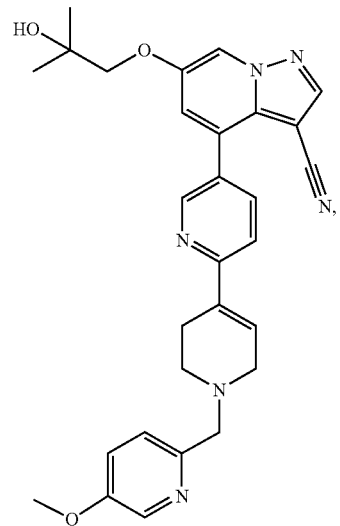

67
-continued
68
-continued
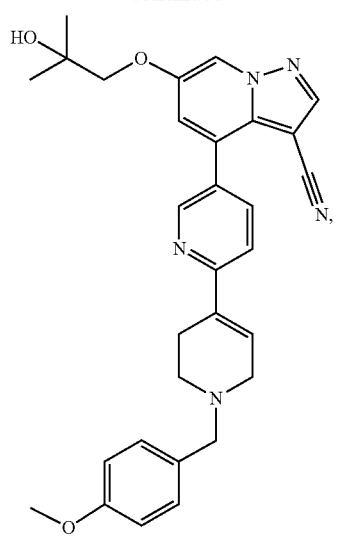
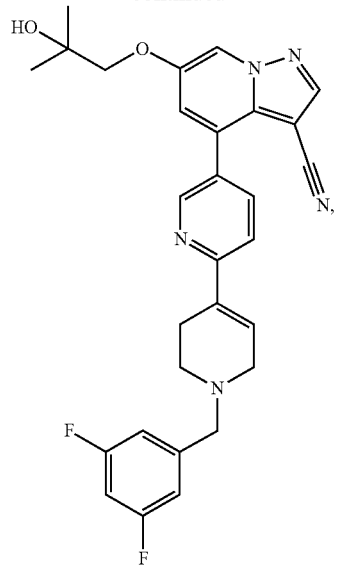 [SMILES: CC(C)(O)COc1cc(-c2ccc(C3=CCN(Cc4cc(F)cc(F)c4)CC3)nc2)c2c(C#N)cnn2c1]
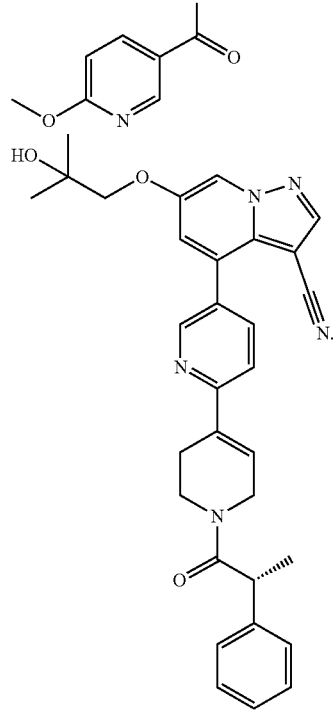

7. The compound according to claim 2, wherein
$X^1$, $X^2$, $X^3$, and $X^4$ are each selected from the group consisting of CH and N;
0, 1, or 2 of $X^1$, $X^2$, $X^3$, and $X^4$ is/are N; and
$X^1$ is N, and $X^2$, $X^3$, and $X^4$ are CH.

8. The compound according to claim 2, wherein
$L_2$ is selected from the group consisting of a bond, -(alkylene)-, —C(O)—, —SO$_2$—, -(alkylene)-O—, -(alkylene)-S—, -(alkylene)-NR$^1$—, and —C(O)-(alkylene)-.

9. The compound according to claim 2, wherein B is selected from the group consisting of:
(i) 5-6 membered heteroaryl, wherein the heteroaryl is optionally substituted by one or more substituents selected from the group consisting of alkyl and halogen;
(ii) alkyl, wherein the alkyl is optionally substituted by one or more hydroxyl;
(iii) alkenyl or alkynyl, wherein the alkenyl or alkynyl is optionally substituted by one or more hydroxyl.

10. A pharmaceutical composition comprising an effective amount of the compound according to claim 1, and a pharmaceutically acceptable carrier or an excipient.

11. A preparation method of the compound according to claim 1, comprising:

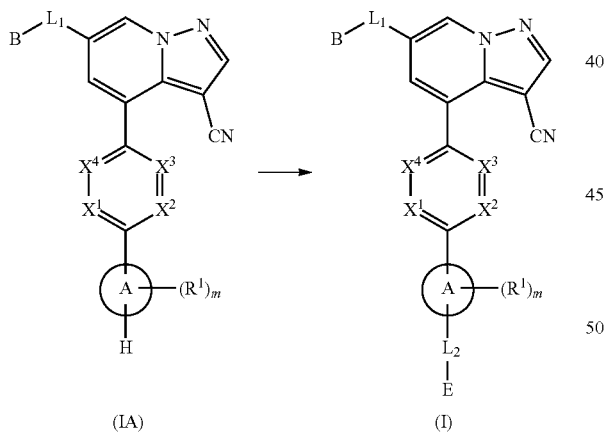

(IA)  (I)

subjecting a compound of a general formula (IA) to a reaction with E-(alkylene)-OMs, EC(O)X, E-(alkylene)-C(O)X, or E-C(O)H to obtain the compound of the general formula (I),
wherein X is selected from the group consisting of hydroxyl and halogen, and the halogen comprises Cl, and Br;
$L_1$, $L_2$, B, E, $X^1$, $X^2$, $X^3$, $X^4$, $R^1$, and m are as defined in claim 1.

12. A compound, represented by general formula (IA):

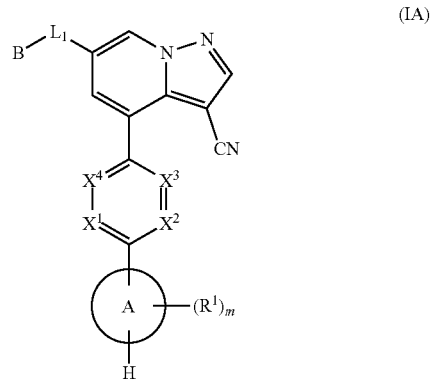

wherein $L_1$, B, $X^1$, $X^2$, $X^3$, $X^4$, $R^1$, and m are as defined in claim 1.

13. The compound according to claim 12, wherein the compound is selected from the group consisting of:

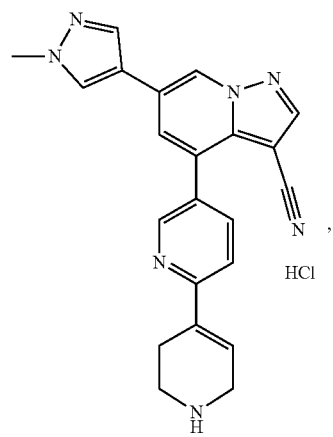

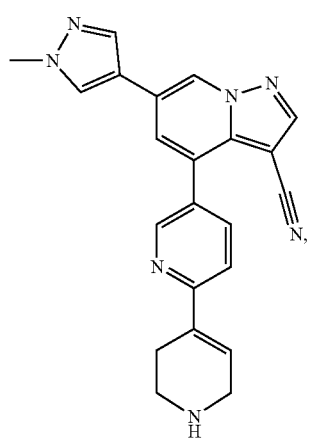

71
-continued
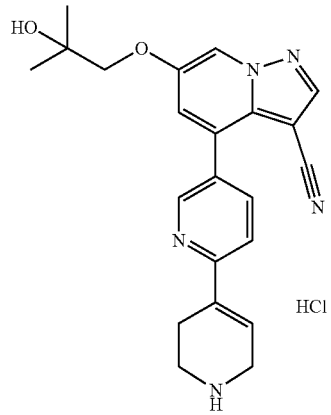 [SMILES: CC(C)(O)COc1cc(-c2ccc(C3=CCNCC3)nc2)c2c(C#N)cnn2c1]
HCl, or
72
-continued
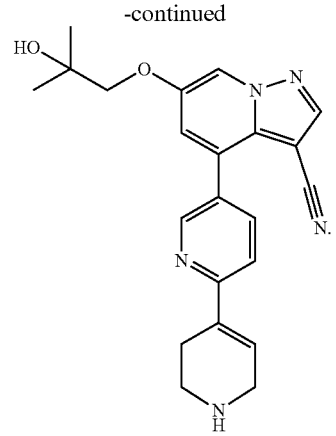
* * * * *